(12) United States Patent
Tucker et al.

(10) Patent No.: US 11,897,238 B2
(45) Date of Patent: Feb. 13, 2024

(54) FILMS AND BAGS HAVING THREE DIMENSIONAL PATTERNS

(71) Applicant: THE GLAD PRODUCTS COMPANY, Oakland, CA (US)

(72) Inventors: Edward B. Tucker, Willowbrook, IL (US); Robert T. Dorsey, Willowbrook, IL (US); Zeljko Vidovic, Willowbrook, IL (US)

(73) Assignee: The Glad Products Company, Oakland, CA (US)

( * ) Notice: Subject to any disclaimer, the term of this patent is extended or adjusted under 35 U.S.C. 154(b) by 229 days.

(21) Appl. No.: 17/289,667

(22) PCT Filed: Nov. 11, 2019

(86) PCT No.: PCT/US2019/060678
§ 371 (c)(1),
(2) Date: Apr. 28, 2021

(87) PCT Pub. No.: WO2020/102052
PCT Pub. Date: May 22, 2020

(65) Prior Publication Data
US 2021/0402733 A1 Dec. 30, 2021

Related U.S. Application Data

(60) Provisional application No. 62/760,963, filed on Nov. 14, 2018.

(51) Int. Cl.
*B32B 3/30* (2006.01)
*B29C 59/04* (2006.01)
(Continued)

(52) U.S. Cl.
CPC ............... *B32B 3/30* (2013.01); *B29C 59/04* (2013.01); *B32B 1/00* (2013.01); *B32B 27/08* (2013.01);
(Continued)

(58) Field of Classification Search
CPC .. B32B 3/30; B32B 1/00; B32B 27/08; B29C 59/04; B65D 33/004; B65D 33/28; B65D 65/40
(Continued)

(56) References Cited

U.S. PATENT DOCUMENTS 2,875,543 A * 3/1959 Sylvester .................. B44F 1/00
264/293
4,778,644 A 10/1988 Curro et al.
(Continued)

FOREIGN PATENT DOCUMENTS

CN 104411483 A 3/2015
CN 204222116 U 3/2015
(Continued)

OTHER PUBLICATIONS

Office Action as received in Chinese application 201980089184.4 dated Sep. 13, 2022.
(Continued)

*Primary Examiner* — Peter N Helvey
(74) *Attorney, Agent, or Firm* — Keller Preece PLLC

(57) ABSTRACT

A thermoplastic film which embodies a three-dimensional pattern. The thermoplastic film comprises a three-dimensional pattern including at least three sub-patterns of deformations. The shape, positioning, and pattern deformation density of the at least three sub-patterns of deformations cause the three-dimensional pattern to give the thermoplastic film a thicker appearance.

13 Claims, 14 Drawing Sheets

(51) Int. Cl.
*B32B 1/00* (2006.01)
*B32B 27/08* (2006.01)
*B65D 33/00* (2006.01)
*B65D 33/28* (2006.01)
*B65D 65/40* (2006.01)
*B31B 70/64* (2017.01)
*B31B 155/00* (2017.01)
*B31B 170/20* (2017.01)
*B31B 70/88* (2017.01)
*B31B 70/16* (2017.01)
*B29K 101/12* (2006.01)
*B29L 7/00* (2006.01)

(52) U.S. Cl.
CPC ........... *B65D 33/004* (2013.01); *B65D 33/28* (2013.01); *B65D 65/40* (2013.01); *B29K 2101/12* (2013.01); *B29L 2007/008* (2013.01); *B31B 70/16* (2017.08); *B31B 70/64* (2017.08); *B31B 70/88* (2017.08); *B31B 2155/00* (2017.08); *B31B 2170/20* (2017.08); *B32B 2439/06* (2013.01)

(58) Field of Classification Search
USPC .......................................................... 383/105
See application file for complete search history.

(56) References Cited

U.S. PATENT DOCUMENTS

| | | | |
|---|---|---|---|
| 4,859,510 A | 8/1989 | Cabe, Jr. et al. | |
| 5,098,755 A | 3/1992 | Tanquary et al. | |
| D502,004 S * | 2/2005 | Olson | D5/53 |
| 7,687,134 B2 * | 3/2010 | Withers | B29D 7/01 |
| | | | 428/167 |
| 9,365,324 B2 | 6/2016 | Wilcoxen et al. | |
| 9,381,697 B2 | 7/2016 | Dorsey et al. | |
| 9,522,768 B2 | 12/2016 | Wilcoxen et al. | |
| 9,669,595 B2 * | 6/2017 | Borchardt | B32B 27/32 |
| 2008/0138638 A1 * | 6/2008 | Withers | B29D 7/01 |
| | | | 428/480 |
| 2011/0052105 A1 | 3/2011 | Wilcoxen et al. | |
| 2019/0315567 A1 * | 10/2019 | Cobler | B32B 27/08 |

FOREIGN PATENT DOCUMENTS

| | | |
|---|---|---|
| CN | 104540669 A | 4/2015 |
| WO | 2007/011360 A1 | 1/2007 |
| WO | WO 2007/011360 A1 | 1/2007 |

OTHER PUBLICATIONS

International Search Report and Written Opinion as received in PCT Application PCT/US2019/060678 dated Mar. 10, 2020.

\* cited by examiner

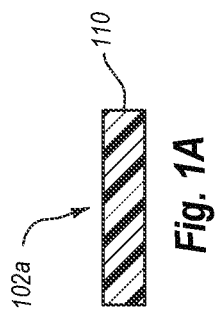
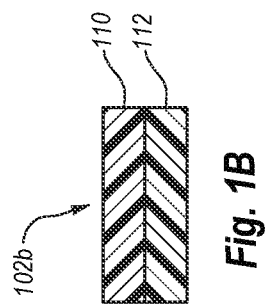
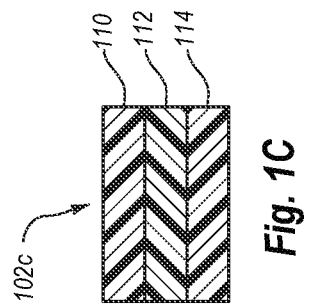

FILMS AND BAGS HAVING THREE DIMENSIONAL PATTERNS

CROSS-REFERENCE

This application is a 35 U.S.C. 371 national phase of PCT International Application No. US2019/60678, filed on Nov. 11, 2019, which claims the benefit of and priority to U.S. Provisional Application No. 62/760,963, filed Nov. 14, 2018. The contents of the above-referenced applications are hereby incorporated by the reference in their entirety.

BACKGROUND

1. Technical Field

The present application relates generally to thermoplastic films and structures formed therefrom. More particularly, the present invention relates to thermoplastic films exhibiting three-dimensional patterns.

2. Background and Relevant Art

Thermoplastic films are a common component in various commercial and consumer products. For example, grocery bags, trash bags, sacks, and packaging materials are products that are commonly made from thermoplastic films. Additionally, feminine hygiene products, baby diapers, adult incontinence products, and many other products include thermoplastic films to one extent or another.

The cost to produce products including thermoplastic film is directly related to the cost of the thermoplastic film. Recently the cost of thermoplastic materials has risen. In response, many manufacturers attempt to control manufacturing costs by decreasing the amount of thermoplastic material in a given product.

One way manufacturers may attempt to reduce production costs is to use thinner films or stretch the thermoplastic films, thereby increasing surface area and reducing the amount of thermoplastic film needed to produce a product of a given size. Common directions of stretching include "machine direction" and "transverse direction" stretching. As used herein, the term "machine direction" or "MD" refers to the direction along the length of the film, or in other words, the direction of the film as the film is formed during extrusion and/or coating. As used herein, the term "transverse direction" or "TD" refers to the direction across the film or perpendicular to the machine direction.

Common ways of stretching film in the machine direction include machine direction orientation ("MDO") and incremental stretching. MDO involves stretching the film between pairs of smooth rollers. Commonly, MDO involves running a film through the nips of sequential pairs of smooth rollers. The first pair of rollers rotates at a speed less than that of the second pair of rollers. The difference in speed of rotation of the pairs of rollers can cause the film between the pairs of rollers to stretch. The ratio of the roller speeds will roughly determine the amount that the film is stretched. MDO stretches the film continuously in the machine direction and is often used to create an oriented film.

Incremental stretching of thermoplastic film, on the other hand, typically involves running the film between grooved or toothed rollers. The grooves or teeth on the rollers intermesh and stretch the film as the film passes between the rollers. Incremental stretching can stretch a film in many small increments that are evenly spaced across the film. The depth at which the intermeshing teeth engage can control the degree of stretching.

Unfortunately, stretched or otherwise thinned thermoplastic films can have undesirable properties. For example, thinner thermoplastic films are typically more transparent or translucent. Additionally, consumers commonly associate thinner films with weakness. Such consumers may feel that they are receiving less value for their money when purchasing products with thinner films; and thus, may be dissuaded to purchase thinner thermoplastic films. As such, manufacturers may be dissuaded to stretch a film or use thinner films despite the potential material savings.

Accordingly, there are a number of considerations to be made in thermoplastic films and manufacturing methods.

BRIEF SUMMARY

One or more implementations of the present disclosure solve one or more problems in the art with thermoplastic films including three-dimensional patterns. For example, in one or more implementations, a three-dimensional pattern as described herein gives a thermoplastic film a three-dimensional appearance. By imparting a three-dimensional appearance to the surface of the thermoplastic film, one or more implementations described herein make the thermoplastic film appear thicker. This thicker appearance can cause consumers to feel they are receiving a thicker product even though they are purchasing products with thinner films.

For example, an implementation of a thermoplastic film exhibiting a three-dimensional effect includes a first plurality of deformations in a first pattern, a second plurality of deformations in a second pattern, and a third plurality of deformations in a third pattern. The first pattern, the second pattern, and the third pattern provide a three-dimensional appearance to the thermoplastic film thereby causing the film to appear thicker.

Additionally, an implementation of a thermoplastic bag exhibiting a three-dimensional effect includes a first sidewall and a second sidewall joined together along a first side edge, a second side edge, and a bottom edge. The thermoplastic bag further includes an opening opposite the bottom edge. The first and second sidewalls include a first plurality of deformations in a first pattern, a second plurality of deformations in a second pattern, and a third plurality of deformations in a third pattern. The first pattern, the second pattern, and the third pattern provide a three-dimensional appearance to the first and second sidewalls of the thermoplastic bag thereby causing the sidewalls to appear thicker.

In addition to the foregoing, an implementation of a method of making a thermoplastic film exhibiting a three-dimensional effect involves passing a thermoplastic film between a first intermeshing roller and a second intermeshing roller, wherein at least one of the first intermeshing roller and the second intermeshing roller comprises a repeat unit of a plurality of protrusions. The repeat unit can cause a creation of a three-dimensional pattern in the thermoplastic film, the three-dimensional pattern including a first plurality of deformations in a first pattern, a second plurality of deformations in a second pattern, and a third plurality of deformations in a third pattern. The first pattern, the second pattern, and the third pattern can provide a three-dimensional appearance to the thermoplastic film.

Additional features and advantages of will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above recited and other advantages and features of the present disclosure can be obtained, a more particular description of the present disclosure briefly described above will be rendered by reference to specific implementations thereof which are illustrated in the appended drawings. It should be noted that the figures are not drawn to scale, and that elements of similar structure or function are generally represented by like reference numerals for illustrative purposes throughout the figures. Understanding that these drawings depict only typical implementations of the present disclosure and are not therefore to be considered to be limiting of its scope, the present disclosure will be described and explained with additional specificity and detail through the use of the accompanying drawings in which:

FIG. 1A-1C show partial side cross-sectional views of thermoplastic films having varying numbers of sublayers according to one or more implementations of the present disclosure;

DETAILED DESCRIPTION

Figure 2:
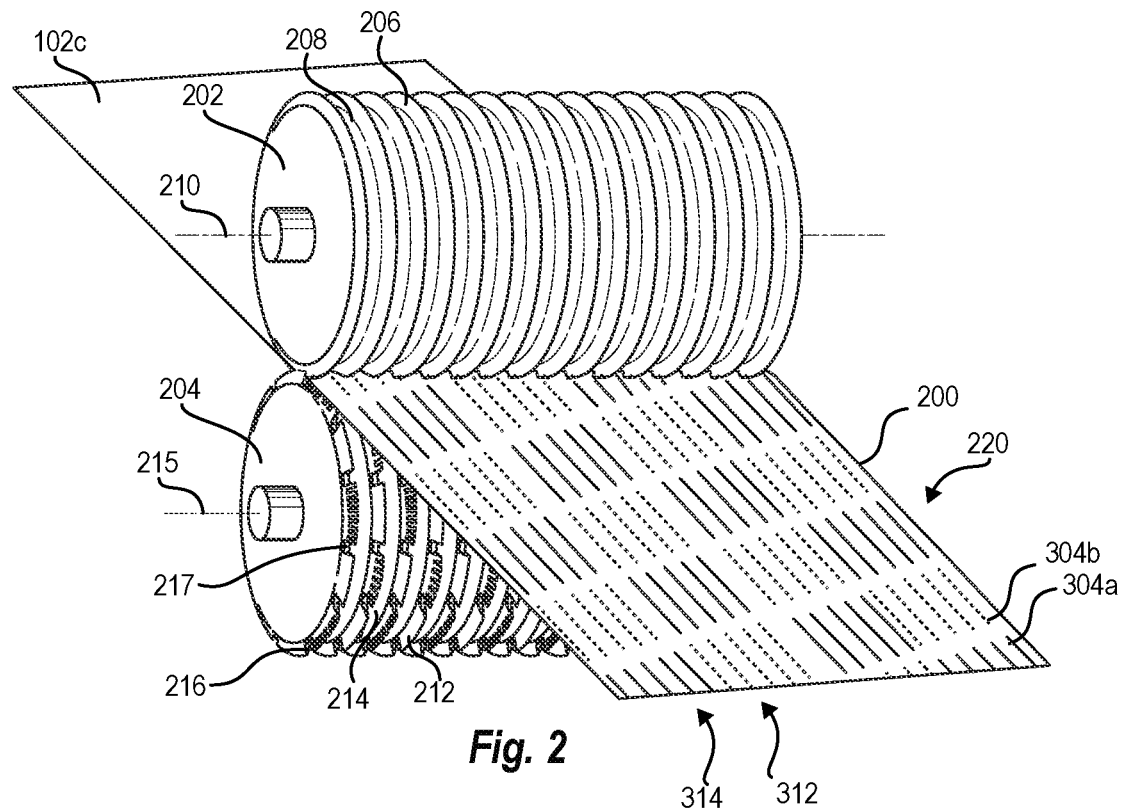
FIG. 2 shows a perspective view of a pair of structural elastic like film (SELF) rollers utilized to form patterns of deformations (e.g., raised rib-like elements) in films according to one or more implementations of the present disclosure.

One or more implementations of the present invention include apparatus and methods for creating single or multi-layered thermoplastic films exhibiting three-dimensional patterns. In particular, one or more implementations of the present invention include a thermoplastic film with a three-dimensional pattern that imparts a three-dimensional appearance to the thermoplastic film.

In one implementation, the three-dimensional pattern can include, or be created by, a plurality of sub-patterns of deformations. For example, each sub-pattern of deformations can include a unique pattern deformation density. Additionally, the sub-patterns can be placed within the three-dimensional pattern such that their positioning and pattern deformation density create the illusion of height, and therefore thickness.

In another implementation, the three-dimensional pattern can include sub-patterns can include a unique pattern deformation density and positioning to create the appearance of sides of an object as if shaded from a single common light point source. This illusion of shading also creates the appearance of thickness.

As described in greater detail below, one or more embodiments involve forming the deformations into a film using one or more of structural elastic like film (SELF) processes, ring rolling, or embossing. The arrangement of the patterns of deformations provide the three-dimensional effects mentioned above. In addition to providing the three-dimensional effects, the deformations can provide increased film properties (tear resistance, elasticity, etc.). Still further the deformations can provide texture and/or increased loft/gauge, which can connote or provide strength to the film.

As discussed above, the structures of one or more implementations can comprise multiple thermoplastic films (e.g., two or more) that are non-continuously laminated together. One or more implementations can involve laminating the layers of the non-continuously laminated structure of thermoplastic films using the same process to form the deformations in a single step (e.g., via ring rolling, a structural elastic like film process, or embossing). In alternative embodiments, the layers can be bonded via adhesives, ultrasonic bonding, or other techniques.

The non-continuous bonding can enhance the strength and other properties of the thermoplastic films exhibiting three-dimensional patterns. In particular, one or more implementations provide for forming bonds between adjacent films of a non-continuously laminated structure that are relatively light such that forces acting on the non-continuously laminated structure are first absorbed by breaking the bonds rather than, or prior to, tearing or otherwise causing the failure of the films of the non-continuously laminated structure. Such implementations can provide an overall thinner structure employing a reduced amount of raw material that nonetheless has maintained or increased strength parameters. Alternatively, such implementations can use a given amount of raw material and provide a structure with increased strength parameters.

In particular, the light bonds or bond regions of adjacent films of non-continuously laminated structures in accordance with one or more implementations can act to first absorb forces via breaking of the bonds prior to allowing that same force to cause failure of the individual films of the non-continuously laminated structure of thermoplastic films. Such action can provide increased strength to the non-continuously laminated structure of thermoplastic films. In one or more implementations, the light bonds or bond regions include a bond strength that is advantageously less than a weakest tear resistance of each of the individual films so as to cause the bonds to fail prior to failing of the films. Indeed, one or more implementations include bonds that the release just prior to any localized tearing of the layers of the non-continuously laminated structure of thermoplastic films.

Thus, in one or more implementations, the light bonds or bond regions of a non-continuously laminated structure of thermoplastic films can fail before either of the individual layers undergoes molecular-level deformation. For example, an applied strain can pull the light bonds or bond regions apart prior to any molecular-level deformation (stretching, tearing, puncturing, etc.) of the individual films. In other words, the light bonds or bond regions can provide less resistive force to an applied strain than molecular-level deformation of any of the layers of the non-continuously laminated structure of thermoplastic films. The inventors have surprisingly found that such a configuration of light bonding can provide increased strength properties to the non-continuously laminated structure of thermoplastic films as compared to a monolayer film of equal thickness or a non-continuously laminated structure in which the plurality of films are tightly bonded together or continuously bonded (e.g., coextruded).

One or more implementations of the present invention provide for tailoring the bonds or bond regions between layers of a non-continuously laminated structure of thermoplastic films to ensure light bonding and associated increased strength. For example, one or more implementations include modifying or tailoring one or more of a bond strength, bond density, bond pattern, or bond size between adjacent layers of a non-continuously laminated structure of thermoplastic films to deliver a structure with strength characteristics better than or equal to the sum of the strength characteristics of the individual films. Such bond tailoring can allow for non-continuously laminated structure of thermoplastic films at a lower basis weight (amount of raw material) to perform the same as or better than higher basis weight mono-layer or co-extruded films. The bonds can be tailored such that they fail when subjected to forces and conditions consistent with normal use of a product incorporating the non-continuously laminated structure of thermoplastic films. For example, when the non-continuously laminated structure of thermoplastic films is formed into a garbage bag, the bonds between the layers of the non-continuously laminated structure can be tailored to fail when subjected to forces consistent with objects being placed into the garbage bag, consistent with the garbage bag being removed from a container (e.g., garbage can), or consistent with the garbage bag being carried from one location to another location.

As used herein, the terms "lamination," "laminate," and "laminated film," refer to the process and resulting product made by bonding together two or more layers of film or other material. The term "bonding", when used in reference to bonding of multiple films of a non-continuously laminated structure of thermoplastic films, may be used interchangeably with "lamination" of the layers. According to methods of one or more embodiments of the present invention, adjacent films of a non-continuously laminated structure of thermoplastic films are laminated or bonded to one another. The bonding purposely results in a relatively weak bond between the layers that has a bond strength that is less than the strength of the weakest layer of the structure. This allows the lamination bonds to fail before the layer, and thus the structure, fails.

As a verb, "laminate" means to affix or adhere (by means of, for example, adhesive bonding, pressure bonding, ultrasonic bonding, corona lamination, heat lamination, and the like) two or more separately made film articles to one another so as to form a multi-layer structure. As a noun, "laminate" means a product produced by the affixing or adhering just described.

In one or more implementations, the light lamination or bonding between films of a non-continuously laminated structure of thermoplastic films may be non-continuous (i.e., discontinuous or partial discontinuous). As used herein the terms "discontinuous bonding" or "discontinuous lamination" refers to lamination of two or more layers where the lamination is not continuous in the machine direction and not continuous in the transverse direction. More particularly, discontinuous lamination refers to lamination of two or more layers with repeating bonded patterns broken up by repeating un-bonded areas in both the machine direction and the transverse direction of the film.

As used herein the terms "partially discontinuous bonding" or "partially discontinuous lamination" refers to lamination of two or more layers where the lamination is substantially continuous in the machine direction or in the transverse direction, but not continuous in the other of the machine direction or the transverse direction. Alternately, partially discontinuous lamination refers to lamination of two or more layers where the lamination is substantially continuous in the width of the article but not continuous in the height of the article, or substantially continuous in the height of the article but not continuous in the width of the article. More particularly, partially discontinuous lamination refers to lamination of two or more layers with repeating bonded patterns broken up by repeating unbounded areas in either the machine direction, the transverse direction or both. Both partially discontinuous and discontinuous are types of non-continuous bonding (i.e., bonding that is not complete and continuous between two surfaces).

In addition to non-continuous bonding, one or more implementations include incrementally stretching one or more films exhibiting a three-dimensional effect. For example, one or more implementations includes incrementally stretching a film using MD ring rolling, TD ring rolling, diagonal direction ring rolling, the formation of strainable networks, or combinations thereof. Incrementally stretching a film using the methods described herein can impart ribs or other structures to the film and increase or otherwise modify one or more of the tensile strength, tear resistance, impact resistance, or elasticity of the film. Furthermore, one or more embodiments involve stretching processes with ambient or cold (non-heated) conditions. This differs significantly from most conventional processes that stretch films under heated conditions. Stretching under ambient or cold conditions in accordance with one or more implementations can constrain the molecules in the film so they are not as easily oriented as under heated conditions. Such cold incremental stretching can help provide the unexpected result of maintaining or increasing the strength of a thermoplastic film, despite a reduction in gauge.

Relatively weak bonding and stretching can be accomplished simultaneously through one or more suitable techniques. For example, bonding and stretching may be achieved by pressure (for example MD ring rolling, TD ring rolling, helical or DD ring rolling, stainable network lamination, or embossing), or with a combination of heat and pressure. Alternately, a manufacturer can first stretch the films and then bond the films using one or more bonding techniques. For example, one or more implementations can include ultrasonic bonding to lightly laminate the films. Alternately or additionally, adhesives can laminate the films. Treatment with a Corona discharge can enhance any of the above methods. In one or more embodiments, the contacting surfaces/layers can comprise a tacky material to facilitate lamination. Prior to lamination, the separate films can be film or can be subject to separate processes, such as stretching, slitting, coating and printing, and corona treatment.

In addition to the foregoing, one or more implementations provide for forming a thermoplastic film having three-dimensional patterns into a bag. By forming a bag out of a thermoplastic film with a three-dimensional pattern that creates a three-dimensional effect, the one or more implementations can give the impression to consumers of a thicker bag. As mentioned above, consumers often associate thicker bags with greater value, even though thicker bags may not exhibit greater performance qualities over thinner bags.

Film Materials

As an initial matter, the thermoplastic material of the films of one or more implementations of the present disclosure may include thermoplastic polyolefins, including polyethylene and copolymers thereof and polypropylene and copolymers thereof. The olefin-based polymers may include ethylene or propylene based polymers such as polyethylene, polypropylene, and copolymers such as ethylene vinyl acetate (EVA), ethylene methyl acrylate (EMA) and ethylene acrylic acid (EAA), or blends of such polyolefins.

Other examples of polymers suitable for use as films in accordance with the present disclosure may include elastomeric polymers. Suitable elastomeric polymers may also be biodegradable or environmentally degradable. Suitable elastomeric polymers for the film include poly(ethylene-butene), poly(ethylene-hexene), poly(ethylene-octene), poly(ethylene-propylene), poly(styrene-butadiene-styrene), poly(styrene-isoprene-styrene), poly(styrene-ethylene-butylene-styrene), poly(ester-ether), poly(ether-amide), poly(ethylene-vinylacetate), poly(ethylene-methylacrylate), poly(ethylene-acrylic acid), oriented poly(ethylene-terephthalate), poly(ethylene-butylacrylate), polyurethane, poly(ethylene-propylene-diene), ethylene-propylene rubber, nylon, etc.

Some of the examples and description herein below refer to films formed from linear low-density polyethylene. The term "linear low density polyethylene" (LLDPE) as used herein is defined to mean a copolymer of ethylene and a minor amount of an olefin containing 4 to 10 carbon atoms, having a density of from about 0.910 to about 0.930, and a melt index (MI) of from about 0.5 to about 10. For example, some examples herein use an octene comonomer, solution phase LLDPE (MI=1.1; $\rho$=0.920). Additionally, other examples use a gas phase LLDPE, which is a hexene gas phase LLDPE formulated with slip/AB (MI=1.0; $\rho$=0.920). Still further examples use a gas phase LLDPE, which is a hexene gas phase LLDPE formulated with slip/AB (MI=1.0; $\rho$=0.926). One will appreciate that the present disclosure is not limited to LLDPE, and can include "high density polyethylene" (HDPE), "low density polyethylene" (LDPE), and "very low density polyethylene" (VLDPE). Indeed, films made from any of the previously mentioned thermoplastic materials or combinations thereof can be suitable for use with the present disclosure.

Some implementations of the present disclosure may include any flexible or pliable thermoplastic material that may be formed or drawn into a web or film. Furthermore, the thermoplastic materials may include a single layer or multiple layers. The thermoplastic material may be opaque, transparent, translucent, or tinted. Furthermore, the thermoplastic material may be gas permeable or impermeable.

As used herein, the term "flexible" refers to materials that are capable of being flexed or bent, especially repeatedly, such that they are pliant and yieldable in response to externally applied forces. Accordingly, "flexible" is substantially opposite in meaning to the terms inflexible, rigid, or unyielding. Materials and structures that are flexible, therefore, may be altered in shape and structure to accommodate external forces and to conform to the shape of objects brought into contact with them without losing their integrity. In accordance with further prior art materials, web materials are provided which exhibit an "elastic-like" behavior in the direction of applied strain without the use of added traditional elastic materials. As used herein, the term "elastic-like" describes the behavior of web materials which when subjected to an applied strain, the web materials extend in the direction of applied strain, and when the applied strain is released the web materials return, to a degree, to their pre-strained condition.

As used herein, the term "substantially," in reference to a given parameter, property, or condition, means to a degree that one of ordinary skill in the art would understand that the given parameter, property, or condition is met within a degree of variance, such as within acceptable manufacturing tolerances. By way of example, depending on the particular parameter, property, or condition that is substantially met, the parameter, property, or condition may be at least 70.0% met, at least 80.0%, at least 90% met, at least 95.0% met, at least 99.0% met, or even at least 99.9% met.

Additional additives that may be included in one or more implementations include slip agents, anti-block agents, voiding agents, or tackifiers. Additionally, one or more implementations of the present disclosure include films that are devoid of voiding agents. Some examples of inorganic voiding agents, which may further provide odor control, include the following but are not limited to: calcium carbonate, magnesium carbonate, barium carbonate, calcium sulfate, magnesium sulfate, barium sulfate, calcium oxide, magnesium oxide, titanium oxide, zinc oxide, aluminum hydroxide, magnesium hydroxide, talc, clay, silica, alumina, mica, glass powder, starch, charcoal, zeolites, any combination thereof, etc. Organic voiding agents, polymers that are immiscible in the major polymer matrix, can also be used. For instance, polystyrene can be used as a voiding agent in polyethylene and polypropylene films.

One of ordinary skill in the art will appreciate in view of the present disclosure that manufacturers may form the films or webs to be used with the present disclosure using a wide variety of techniques. For example, a manufacturer can form precursor mix of the thermoplastic material and one or more additives. The manufacturer can then form the film(s) from the precursor mix using conventional flat or cast extrusion or co-extrusion to produce monolayer, bilayer, or multilayer films. Alternatively, a manufacturer can form the films using suitable processes, such as, a blown film process to produce monolayer, bilayer, or multilayer films. If desired for a given end use, the manufacturer can orient the films by trapped bubble, tenterframe, or other suitable process. Additionally, the manufacturer can optionally anneal the films thereafter.

An optional part of the film-making process is a procedure known as "orientation." The orientation of a polymer is a reference to its molecular organization, i.e., the orientation of molecules relative to each other. Similarly, the process of orientation is the process by which directionality (orientation) is imposed upon the polymeric arrangements in the film. The process of orientation is employed to impart desirable properties to films, including making cast films tougher (higher tensile properties). Depending on whether the film is made by casting as a flat film or by blowing as a tubular film, the orientation process can require different procedures. This is related to the different physical characteristics possessed by films made by conventional film-making processes (e.g., casting and blowing). Generally, blown films tend to have greater stiffness and toughness. By contrast, cast films usually have the advantages of greater film clarity and uniformity of thickness and flatness, generally permitting use of a wider range of polymers and producing a higher quality film.

When a film has been stretched in a single direction (mono-axial orientation), the resulting film can exhibit strength and stiffness along the direction of stretch, but can be weak in the other direction, i.e., across the stretch, often splitting when flexed or pulled. To overcome this limitation, two-way or biaxial orientation can be employed to more evenly distribute the strength qualities of the film in two directions. Most biaxial orientation processes use apparatus that stretches the film sequentially, first in one direction and then in the other.

In one or more implementations, the films of the present disclosure are blown film, or cast film. Both a blown film and a cast film can be formed by extrusion. The extruder used can be a conventional one using a die, which will provide the desired gauge. Some useful extruders are described in U.S. Pat. Nos. 4,814,135; 4,857,600; 5,076,988; 5,153,382; each of which are incorporated herein by reference in their entirety. Examples of various extruders, which can be used in producing the films to be used with the present disclosure, can be a single screw type modified with a blown film die, an air ring, and continuous take off equipment.

In one or more implementations, a manufacturer can use multiple extruders to supply different melt streams, which a feed block can order into different channels of a multi-channel die. The multiple extruders can allow a manufacturer to form a film with layers having different compositions. Such multi-layer film may later be provided with a three-dimensional pattern to provide the benefits of the present disclosure.

For example, in one implementation, thermoplastic film layers of a multi-layer film may include different colors. In such an implementation, when provided with a three-dimensional pattern including raised rib-like elements with different pattern densities or depths of engagement, the colors of the multi-layer film plies enhance the effect of the three-dimensional pattern. For instance, the colors of the multi-layer film plies enhance the effect of the three-dimensional pattern by creating more visual contrast between the sub-patterns within the three-dimensional pattern.

In a blown film process, the die can be an upright cylinder with a circular opening. Rollers can pull molten thermoplastic material upward away from the die. An air-ring can cool the film as the film travels upwards. An air outlet can force compressed air into the center of the extruded circular profile, creating a bubble. The air can expand the extruded circular cross section by a multiple of the die diameter. This ratio is called the "blow-up ratio." When using a blown film process, the manufacturer can collapse the film to double the plies of the film. Alternatively, the manufacturer can cut and fold the film, or cut and leave the film unfolded.

In any event, in one or more implementations, the extrusion process can orient the polymer chains of the blown film. The "orientation" of a polymer is a reference to its molecular organization, i.e., the orientation of molecules or polymer chains relative to each other. In particular, the extrusion process can cause the polymer chains of the blown film to be predominantly oriented in the machine direction. The orientation of the polymer chains can result in an increased strength in the direction of the orientation. As used herein predominately oriented in a particular direction means that the polymer chains are more oriented in the particular direction than another direction. One will appreciate, however, that a film that is predominately oriented in a particular direction can still include polymer chains oriented in directions other than the particular direction. Thus, in one or more implementations the initial or starting films (films before being stretched or bonded or laminated in accordance with the principles described herein) can comprise a blown film that is predominately oriented in the machine direction.

The process of blowing up the tubular stock or bubble can further orient the polymer chains of the blown film. In particular, the blow-up process can cause the polymer chains of the blown film to be bi-axially oriented. Despite being bi-axially oriented, in one or more implementations the polymer chains of the blown film are predominantly oriented in the machine direction (i.e., oriented more in the machine direction than the transverse direction).

The films of one or more implementations of the present disclosure can have a starting gauge between about 0.1 mils to about 20 mils, suitably from about 0.2 mils to about 4 mils, suitably in the range of about 0.3 mils to about 2 mils, suitably from about 0.6 mils to about 1.25 mils, suitably from about 0.9 mils to about 1.1 mils, suitably from about 0.3 mils to about 0.7 mils, and suitably from about 0.4 mils and about 0.6 mils. Additionally, the starting gauge of films of one or more implementations of the present disclosure may not be uniform. Thus, the starting gauge of films of one or more implementations of the present disclosure may vary along the length and/or width of the film.

One or more layers of the films described herein can comprise any flexible or pliable material comprising a thermoplastic material and that can be formed or drawn into a web or film. As described above, the film includes a plurality of layers of thermoplastic films. Each individual film layer may itself include a single layer or multiple layers. In other words, the individual layers of the multi-layer film may each themselves comprise a plurality of laminated layers. Such layers may be significantly more tightly bonded together than the bonding provided by the purposely weak discontinuous bonding in the finished multi-layer film. Both tight and relatively weak lamination can be accomplished by joining layers by mechanical pressure, joining layers with adhesives, joining with heat and pressure, spread coating, extrusion coating, ultrasonic bonding, static bonding, cohesive bonding and combinations thereof. Adjacent sub-layers of an individual layer may be coextruded. Co-extrusion results in tight bonding so that the bond strength is greater than the tear resistance of the resulting laminate (i.e., rather than allowing adjacent layers to be peeled apart through breakage of the lamination bonds, the film will tear).

Films having a three-dimensional pattern can may include a single film formed from one, two, three, or more layers of thermoplastic material. FIGS. 1A-1C are partial cross-sectional views of multi-layer films into which a three-dimensional pattern can be formed. Such films can then be used to form products, such as a thermoplastic bag. In some implementations, the film may include a single layer film 102a, as shown in FIG. 1A, comprising a single layer 110. In other embodiments, the film can comprise a two-layer film 102b as shown in FIG. 1B, including a first layer 110 and a second layer 112. The first and second layers 110, 112 can be coextruded. In such implementations, the first and second layers 110, 112 may optionally include different grades of thermoplastic material and/or include different additives, including polymer additives. In yet other implementations, a film be a tri-layer film 102c, as shown in FIG. 1C, including a first layer 110, a second layer 112, and a third layer 114. In yet other implementations, a film may include more than three layers. The tri-layer film 102c can include an A:B:C configuration in which all three layers vary in one or more of gauge, composition, color, transparency, or other properties. Alternatively, the tri-layer film 102c can comprise an A:A:B structure or A:B:A structure in which two layers have the same composition, color, transparency, or other properties. In an A:A:B structure or A:B:A structure the A layers can comprise the same gauge or differing gauge. For example, in an A:A:B structure or A:B:A structure the film layers can comprise layer ratios of 20:20:60, 40:40:20, 15:70:15, 33:34:33, 20:60:20, 40:20:40, or other ratios.

As mentioned above, one or more implementations of the present invention include a thermoplastic film with a three-dimensional pattern; the three-dimensional pattern including multiple sub-patterns. The multiple sub-patterns of the three-dimensional pattern can each include a unique pattern deformation density, shape, and positioning to create a three-dimensional appearance to the three-dimensional pattern.

In one or more implementations, the multiple sub-patterns of the three-dimensional pattern are each created via one or more types of deformations. As used herein, a "deformation" refers to a change, distortion, thinning, or stretching of a thermoplastic film. For example, with regard to SELF'ing described below, a deformation can be a raised rib-like element extending in the Z-direction formed by SELF'ing intermeshing rollers. Still further, with regard to ring rolling, a deformation can be a thick rib defined by thinner stretched webs. In another example, with regard to embossing described below, a deformation can be an engraved formation created by correlating embossing patterns formed by embossing rollers.

The deformations that make up a three-dimensional pattern of the thermoplastic film may be formed or manufactured in various ways. For example, the three-dimensional pattern may be formed by way of cold deformation processing. In one or more implementations, cold deformation processing can include one or more of SELF'ing, ring rolling, or embossing, each of which is described in greater detail below.

FIG. 2 shows a pair of SELF'ing intermeshing rollers 202, 204 (e.g., a first SELF'ing intermeshing roller 202 and a second SELF'ing intermeshing roller 204) for creating strainable networks with complex patterns. As shown in FIG. 2, the first SELF'ing intermeshing roller 202 may include a plurality of ridges 206 and grooves 208 extending generally radially outward in a direction orthogonal to an axis of rotation 210. As a result, the first SELF'ing intermeshing roller 202 can be similar to a transverse direction ("TD") intermeshing roller such as the TD intermeshing rollers described in U.S. Pat. No. 9,186,862 to Broering et al., the disclosure of which is incorporated in its entirety by reference herein. The second SELF'ing intermeshing roller 204 can also include a plurality of ridges 212 and grooves 214 extending generally radially outward in a direction orthogonal to an axis of rotation 215. As shown in FIG. 2, in some embodiments, the ridges 216 of the second SELF'ing intermeshing roller 204 may include a plurality of notches 217 that define a plurality of spaced teeth 216.

As shown by FIG. 2, passing a film, such as film 102c, through the SELF'ing intermeshing rollers 202, 204 can produce a thermoplastic film 200 with one or more strainable networks formed by a structural elastic like process in which the strainable networks have a pattern 220 in the form of a checkerboard pattern. As used herein, the term "strainable network" refers to an interconnected and interrelated group of regions which are able to be extended to some useful degree in a predetermined direction providing the web material with an elastic-like behavior in response to an applied and subsequently released elongation.

Figure 3:
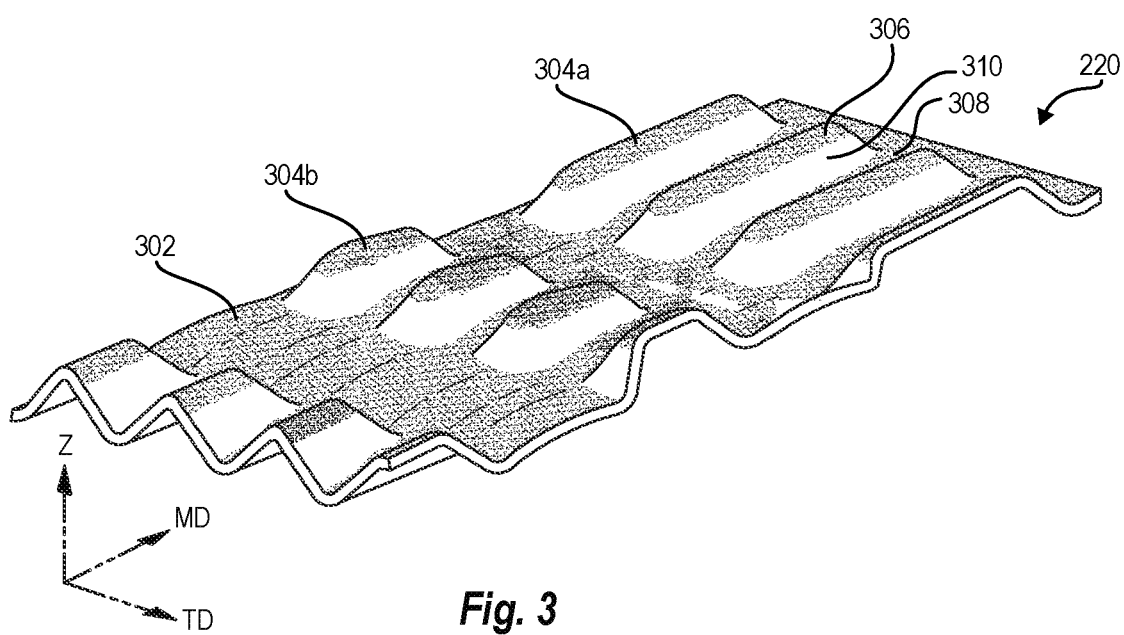
FIG. 3 shows a perspective view of a SELF'ed film according to one or more implementations of the present disclosure.

FIG. 3 shows a portion of the thermoplastic film 200 with the pattern 220. Referring to FIGS. 2 and 3 together, as film (e.g., multi-layer film 102c) passes through the SELF'ing intermeshing rollers 202, 204, the teeth 216 can press a portion of the film out of plane defined by the film to cause permanent deformation of a portion of the film in the Z-direction. For example, the teeth 216 can intermittently stretch a portion of the film 102c in the Z-direction. The portions of the film 102c that pass between the notched regions 217 of the teeth 216 will remain substantially unformed in the Z-direction. As a result of the foregoing, the thermoplastic film 200 with the pattern 220 includes a plurality of isolated deformed, raised, rib-like elements 304 and at least one un-deformed portion (or web area) 302 (e.g., a relatively flat region). As will be understood by one of ordinary skill in the art, the length and width of the rib-like elements 304 depend on the length and width of teeth 216 and the speed and the depth of engagement of the intermeshing rollers 202, 204. The rib-like elements 304 and the un-deformed web areas 302 form a strainable network.

As shown in FIG. 3, the strainable network of the film 200 can include first thicker regions 306, second thicker regions 308, and stretched, thinner transitional regions 310 connecting the first and second thicker regions 306, 308. The first thicker regions 306 and the stretched, thinner regions 310 can form the raised rib-like elements 304 of the strainable network. In one or more embodiments, the first thicker regions 306 are the portions of the film with the greatest displacement in the Z-direction. In one or more embodiments, because the film is displaced in the Z-direction by pushing the rib-like elements 304 in a direction perpendicular to a main surface of the thermoplastic film (thereby stretching the regions 310 upward) a total length and width of the film does not substantially change when the film is subjected to the SELF'ing process of one or more embodiments of the present invention. In other words, the film 102c (film prior to undergoing the SELF'ing process) can have substantially the same width and length as the film 200 resulting from the SELF'ing process.

As shown by FIG. 3, the rib-like elements can have a major axis and a minor axis (i.e., the rib-like elements are elongated such that they are longer than they are wide). As shown by FIGS. 2 and 3, in one or more embodiments, the major axes of the rib-like elements are parallel to the machine direction (i.e., the direction in which the film was extruded). In alternative embodiments, the major axes of the rib-like elements are parallel to the transverse direction. In still further embodiments, the major axes of the rib-like elements are oriented at an angle between 1 and 89 degrees relative to the machine direction. For example, in one or more embodiments, the major axes of the rib-like elements are at a 45-degree angle to the machine direction. In one or more embodiments, the major axes are linear (i.e., in a straight line) in alternative embodiments the major axes are curved or have otherwise non-linear shapes.

The rib-like elements 304 can undergo a substantially "geometric deformation" prior to a "molecular-level deformation." As used herein, the term "molecular-level deformation" refers to deformation, which occurs on a molecular level and is not discernible to the normal naked eye. That is, even though one may be able to discern the effect of molecular-level deformation, e.g., elongation or tearing of the film, one is not able to discern the deformation, which allows or causes it to happen. This is in contrast to the term "geometric deformation," which refers to deformations that are generally discernible to the normal naked eye when a SELF'ed film or articles embodying the such a film are subjected to an applied load or force. Types of geometric deformation include, but are not limited to bending, unfolding, and rotating.

Thus, upon application of a force, the rib-like elements 304 can undergo geometric deformation before undergoing molecular-level deformation. For example, a strain applied to the film 200 in a perpendicular to the major axes of the rib-like elements 304 can pull the rib-like elements 304 back into plane with the web areas 302 prior to any molecular-level deformation of the rib-like elements 304. Geometric deformation can result in significantly less resistive forces to an applied strain than that exhibited by molecular-level deformation.

As mentioned above, the rib-like elements 304 and the web areas 302 can be sized and positioned so as to create a pattern. The pattern can provide one or more of the benefits discussed herein. For example, the pattern can cause a film to have a three-dimensional appearance. The three-dimensional effect can make the film appear thicker.

As shown by FIGS. 2 and 3, groups of raised rib-like elements 304 can be arranged in different arrangements to form a pattern. For example, a first plurality of raised rib-like elements 304a can be arranged in a first pattern 314 and a second plurality of raised rib-like elements 304b arranged in a second pattern 312. The first and the second patterns 314, 312 of raised rib-like elements 304a, 304b can repeat across the thermoplastic film 200. As shown by FIG. 2, first and the second patterns 314, 312 of raised rib-like elements 304a, 304b can form a checkerboard pattern 220.

In one or more implementations, the first pattern 314 is visually distinct from the second pattern 312. As used herein, the term "visually distinct" refers to features of the web material which are readily discernible to the normal naked eye when the web material or objects embodying the web material are subjected to normal use. As described below, the visually-distinct patterns of protrusions (e.g., raised rib-like elements) can provide the film with a three-dimensional effect or appearance.

Figure 4:
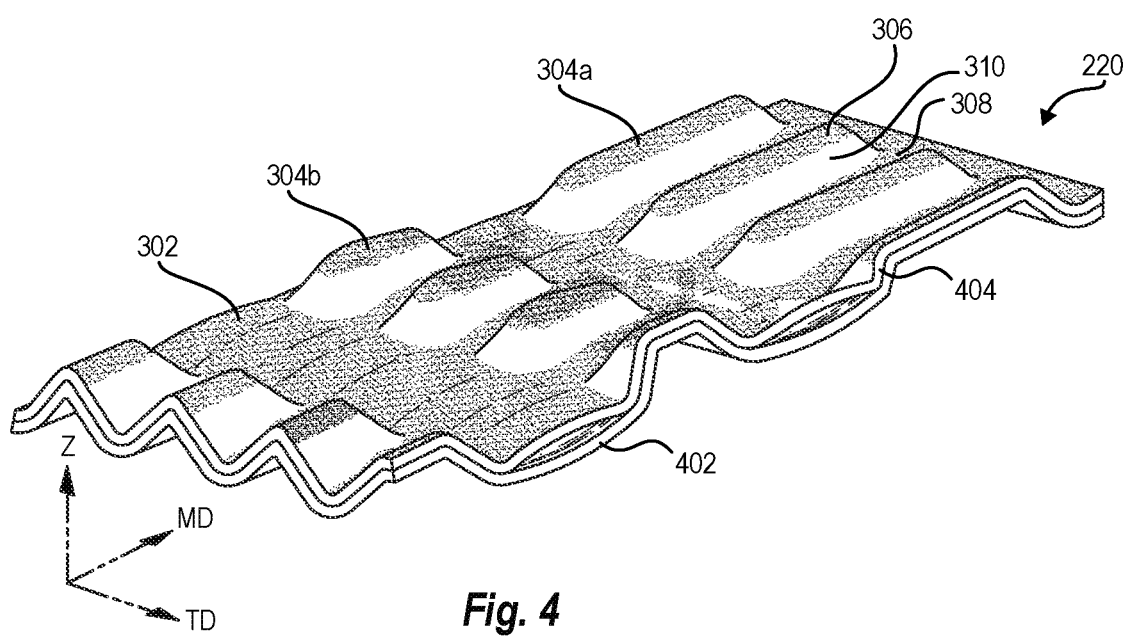
FIG. 4 shows a perspective view of a multi-layer SELF'ed film according to one or more implementations of the present disclosure.

In one or more implementations, the films with a three-dimensional effect may comprise two or more distinct thermoplastic films (i.e., two films extruded separately). The distinct thermoplastic films can be non-continuously bonded to one another. For example, in one or more embodiments two film layers can be passed together through a pair of SELF'ing rollers to produce a multi-layered lightly-bonded laminate film 200a with the pattern 220, as shown in FIG. 4.

The multi-layered lightly-bonded laminate film 200a can comprise a first thermoplastic film 402 partially discontinuously bonded to a second thermoplastic film 404. In one or more embodiments, the bonds between the first thermoplastic film 402 and the second thermoplastic film 404 are aligned with the first thicker regions 306 and are formed by the pressure of the SELF'ing rollers displacing the raised rib-like elements 304a, 304b. Thus, the bonds can be parallel to the raised rib-like elements 304a, 304b and be positioned between raised rib-like elements 304a, 304b of the first thermoplastic film 402 and the second thermoplastic film 404.

In one or more embodiments, the first and second films 402, 404 may be discontinuously bonded together via one or more of the methods of bonding films together as described in U.S. Pat. No. 8,603,609, the disclosure of which is incorporated in its entirety by reference herein. In particular, the first and second films 402, 404 may be bonded via one or more of MD rolling, TD rolling, DD ring rolling, SELF'ing, pressure bonding, corona lamination, adhesives, or combinations thereof. In some implementations, the first and second films 402, 404 may be bonded such that the bonded regions have bond strengths below a strength of the weakest film of the first and second films 402, 404. In other words, the bonded regions may fail (e.g., break apart) before the first or second films 402, 404 fail. As a result, discontinuously bonding the first and second films 402, 404 may can also increase or otherwise modify one or more of the tensile strength, tear resistance, impact resistance, or elasticity of the films. Furthermore, the bonded regions between the first and second films 402, 404 may provide additional strength. Such bonded regions may be broken to absorb forces rather than such forces resulting in tearing of the film.

Furthermore, any of the pressure techniques (i.e., bonding techniques) described in U.S. Pat. No. 8,603,609 may be combined with other techniques in order to further increase the strength of the bonded regions while maintaining bond strength below the strength of the weakest layer of the multi-layer laminate film. For example, heat, pressure, ultrasonic bonding, corona treatment, or coating (e.g., printing) with adhesives may be employed. Treatment with a corona discharge can enhance any of the above methods by increasing the tackiness of the film surface so as to provide a stronger lamination bond, but which is still weaker than the tear resistance of the individual layers.

Discontinuously bonding the first and second films 402, 404 together results in un-bonded regions and bonded regions between the first and second films 402, 404. For example, discontinuously bonding the first and second films 402, 404 together may result in un-bonded regions and bonded regions as described in the U.S. Pat. No. 9,637,278, the disclosure of which is incorporated in its entirety by reference herein.

Figure 5A:
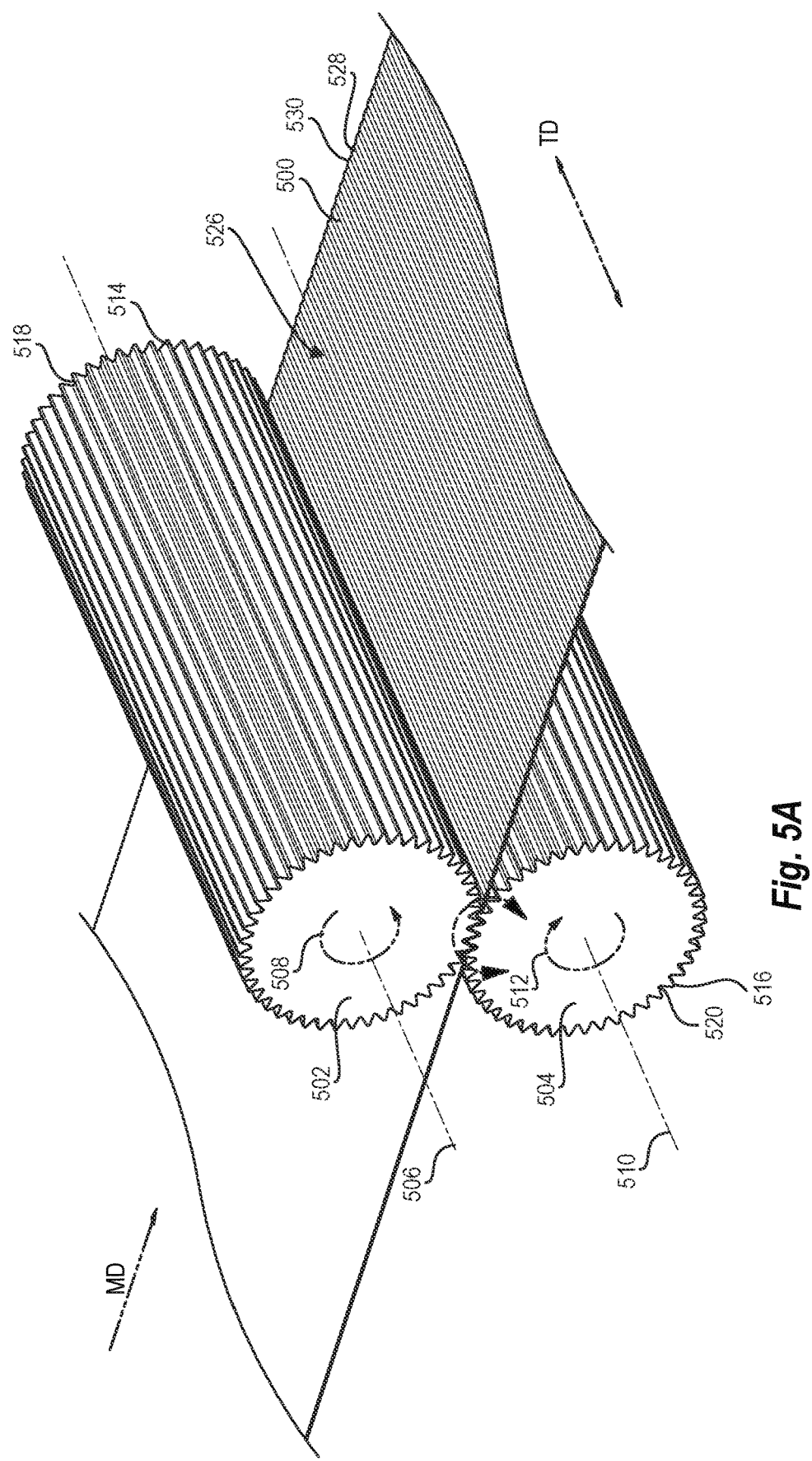
FIG. 5A shows a perspective view of a pair of ring rollers utilized to form patterns of deformations (e.g., thicker ribs and thinner, stretched webs) in films according to one or more implementations of the present disclosure.
Figure 5B:
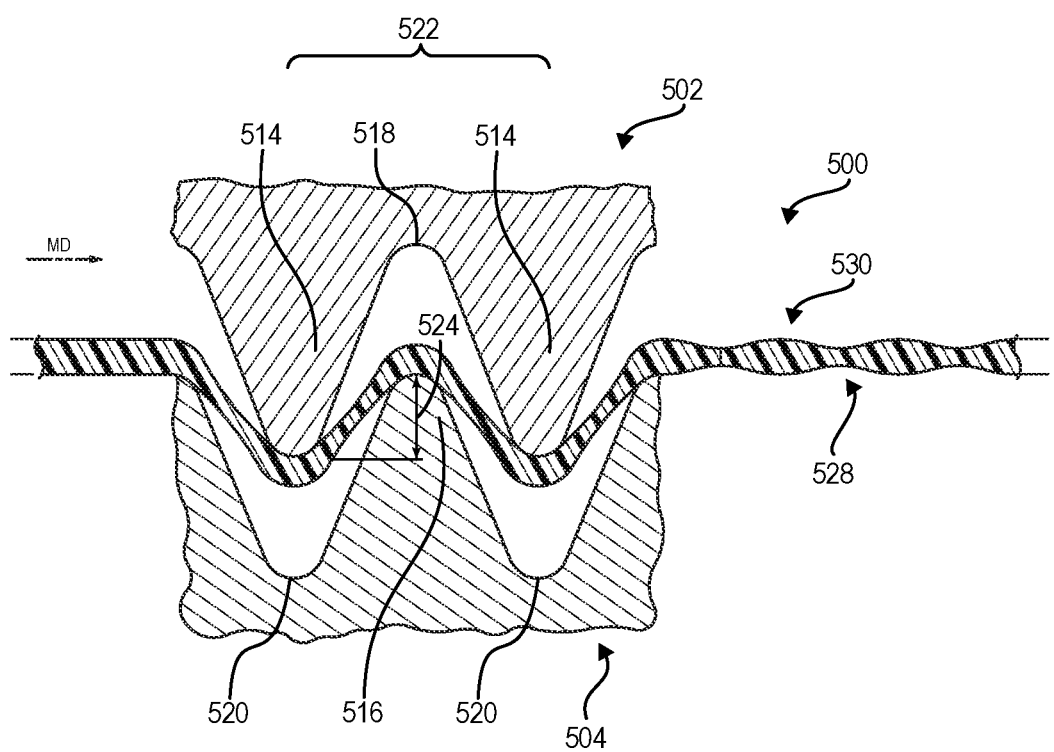
FIG. 5B shows a partial side view of a film passing through the ring rollers shown in FIG. 5A according to one or more implementations of the present disclosure.

As mentioned, the patterns of deformations can be formed via ring rolling in addition to SELFing. FIGS. 5A-5B show additional processes of forming deformations by way of machine direction (MD) ring rolling according to another embodiment of the present disclosure. In particular, FIGS. 5A-5B illustrate an MD ring rolling process that intermittently stretches a film 500 in the machine direction (MD) or in other words the direction in which the films were extruded by passing the film 500 through a pair of MD intermeshing rollers 502, 504 (e.g., a first roller 502 and a second roller 504). The incremental stretching results in deformations in the form of ribs separated by thinner, stretched webs. For example, the process may include any of the rolling processes that intermittently stretches a film as described in U.S. patent application Ser. No. 13/289,829 to Borchardt, the disclosure of which is incorporated in its entirety by reference herein.

As shown by the FIGS. 5A-5B, each of the first roller 502 and the second roller 504 may have a generally cylindrical shape. In some embodiments, the MD intermeshing rollers 502, 504 may comprise cast and/or machined metal, such as, e.g., steel, aluminum, or any other suitable material. In operation, the MD intermeshing rollers 502, 504 can rotate in opposite directions about parallel axes of rotation. For example, as shown in FIG. 5A, the first roller 502 can rotate about a first axis 506 of rotation in a counterclockwise direction 508. FIG. 5A also illustrates that the second roller 504 can rotate about a second axis 510 of rotation in a clockwise direction 512. The axes of rotation 506, 510 can be parallel to the transverse direction (TD) and perpendicular to the machine direction MD.

The intermeshing rollers 502, 504 can closely resemble fine pitch spur gears. In particular, the MD intermeshing rollers 502, 504 can include a plurality of protruding ridges 514, 516 extending radially outward from the axes of rotation 506, 510 of the intermeshing rollers 502, 504. The ridges 514, 516 can be defined by grooves 518, 520 between adjacent ridges 514, 516. For example, grooves 518, 520 can separate adjacent ridges 514, 516. The ridges 514, 516 can extend along the MD intermeshing rollers 502, 504 in a direction generally parallel to axes of rotation 506, 510 and perpendicular to the machine direction of the film 500 passing through the MD intermeshing rollers 502, 504. The ridges 514, 516 can include tips, and the tips of ridges 514, 516 can have a variety of different shapes and configurations. For example, the tips of the ridges 514, 516 can have a rounded shape as shown in FIG. 5B. In alternative implementations, the tips of the ridges 514, 516 can have sharp angled corners.

The ridges 514 on the first roller 502 can be offset or staggered with respect to the ridges 516 on the second roller 504. Thus, the grooves 518 of the first roller 502 can receive the ridges 516 of the second roller 504, as the MD intermeshing rollers 502, 504 intermesh. Similarly, the grooves 520 of the second roller 504 can receive the ridges 514 of the first roller 502.

One will appreciate in view of the disclosure herein that the configuration of the ridges 514, 516 and grooves 518, 520 can prevent contact between ridges 514, 516 during intermeshing so that no rotational torque is transmitted during operation. Additionally, the configuration of the ridges 514, 516 and grooves 518, 520 can affect the amount of intermittent stretching as the film passes through MD intermeshing rollers 502, 504.

Referring specifically to FIG. 5B, various features of the ridges 514, 516 and grooves 518, 520 are shown in greater detail. The pitch and depth of engagement of the ridges 514, 516 can determine, at least in part, the amount of incremental stretching caused by the MD intermeshing rollers 502, 504. As shown by FIG. 5B, the pitch 522 is the distance between the tips of two adjacent ridges on the same roller. The "depth of engagement" ("DOE") 524 is the amount of overlap between ridges 514, 516 of the different MD intermeshing rollers 502, 504 during intermeshing. According to one embodiment, the ratio of DOE to pitch provided by any ring rolling operation is less than about 1.1:1, suitably less than about 1.0:1, suitably between about 0.5:1 and about 1.0:1, or suitably between about 0.8:1 and about 0.9:1.

As shown by FIG. 5A, the direction of travel of the film 500 through the MD intermeshing rollers 502, 504 is parallel to the machine direction and perpendicular to the transverse direction. As the film 500 passes between the MD intermeshing rollers 502, 504, the ridges 514, 516 can intermittently stretch the film 500 in the machine direction. In one or more implementations, stretching the film 500 in the machine direction can reduce the gauge of the film and increase the length of the film 500. In other implementations, the film 500 may rebound after stretching such that the gauge of the film 500 is not decreased. Furthermore, in one or more implementations, stretching the film 500 in the machine direction can reduce the width of the film 500. For example, as the film 500 is lengthened in the machine direction, the film's length can be reduced in the transverse direction.

In particular, as the film 500 proceeds between the MD intermeshing rollers 502, 504, the ridges 514 of the first roller 502 can push the film 500 into the grooves 520 of the second roller 504 and vice versa. The pulling of the film 500 by the ridges 514, 516 can stretch the film 500. The MD intermeshing rollers 502, 504 may not stretch the film 500 evenly along its length. Specifically, the MD intermeshing rollers 502, 504 can stretch the portions of the film 500 between the ridges 514, 516 more than the portions of the film 500 that contact the ridges 514, 516. Thus, the MD intermeshing rollers 502, 504 can impart or form a generally striped pattern 526 into the film 500. As used herein, the terms "impart" and "form" refer to the creation of a desired structure or geometry in a film upon stretching the film that will at least partially retain the desired structure or geometry when the film is no longer subject to any strains or externally applied forces.

As seen in FIG. 5A, upon stretching, the stretched multi-layer film can include a striped pattern 526. The striped pattern 526 can include alternating series of deformations. In particular, the striped pattern 526 can include stretched (or more stretched) regions or thinner webs 528 adjacent to thicker regions (or less stretched) or ribs 530.

While FIGS. 5A-5B illustrate MD intermeshing rollers and an MD incrementally stretched film, other embodiments can comprise TD intermeshing rollers or helical intermeshing rollers to create TD incrementally stretched or helically incrementally stretched films and associated deformations. The helical intermeshing rollers can have teeth oriented between 1 degree and 89 degrees relative to an axis of rotation of the helical intermeshing rollers. Still further embodiments comprise MD and TD incrementally stretched films.

Figure 6:
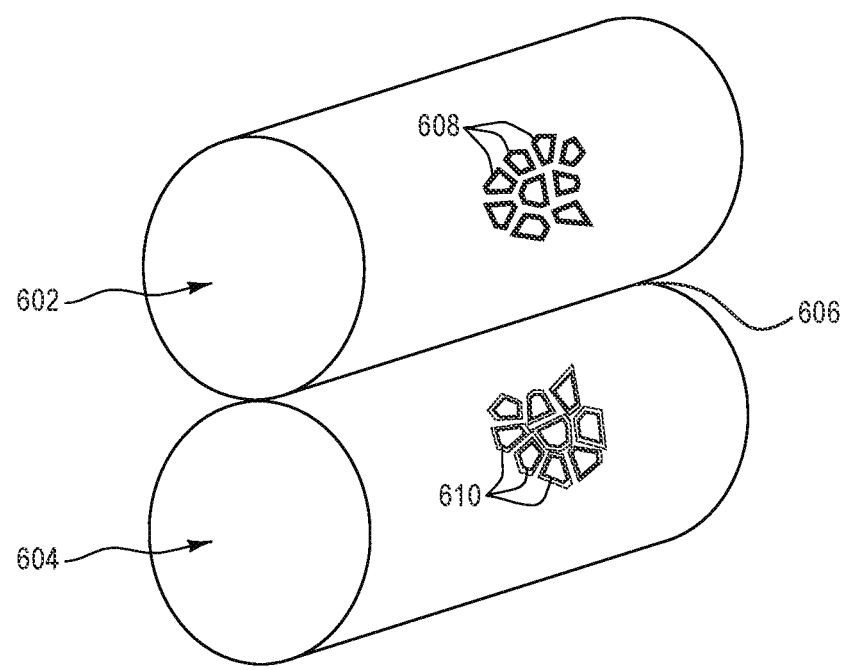
FIG. 6 shows a perspective view of a pair of embossing rollers utilized to form patterns of deformations (e.g., formations pressed into the film) in films according to one or more implementations of the present disclosure.

As mentioned, the patterns of deformations can be formed via embossing in addition to SELFing and ring rolling. FIG. 6 illustrates a pair of embossing rollers 602, 604 for forming a pattern of deformations in a film material that produce a three-dimensional effect. Specifically, the pair of embossing rollers 602, 604 may include a first embossing roller 602 and a second embossing roller 604. Each of the first and second embossing rollers 602, 604 may be cylindrical and may have longitudinal axes that are parallel to each other. The first and second embossing rollers 602, 604 may define a passage 606 therebetween through which a film material may pass through to be embossed.

In some embodiments, as shown in FIG. 6, a first embossing roller 602 may have an embossing pattern 608 formed thereon, and the second embossing roller 604 may have a correlating (e.g., matching) receiving embossing pattern 610 thereon (e.g., engraved therein). The embossing pattern 608 of the first embossing roller 602 may have height of between about 10.0 mils and about 40.0 mils, and the receiving embossing pattern 610 of the second embossing roller 604 may have depth of between about 10.0 mils and about 40.0 mils. While FIG. 6 illustrates that the embossing pattern 608 and the receiving embossing pattern 610 include a plurality of random polygon shaped protrusions and a plurality of matching random polygon shaped recesses, the embossing pattern can be configured in various shapes so as to produce a pattern(s) of deformations that create a three-dimensional effect. In other words, the embossing pattern shown in FIG. 6 is a non-limiting example for ease in explanation.

In some embodiments, one of the first and second embossing rollers 602, 604 may be formed from a relatively hard material (e.g., steel, ebonite or other suitable hard material), and the other may be formed from a softer material (e.g., rubber or other suitable softer material). In other words, the first and second embossing rollers 602, 604 may include a steel-to-rubber embosser. In alternative embodiments, both the first and second embossing rollers 602, 604 may be formed from the relatively hard material (e.g., steel). Put another way, first and second embossing rollers 602, 604 may include a steel-to-steel embosser. Regardless of whether the first and second embossing rollers 602, 604 include a steel-to-rubber embosser or a steel-to-steel embosser, in some embodiments, the one or more of first and second embossing rollers 602, 604 may include an electrically heated steel roll (e.g., means of heating). In alternative embodiments, the neither of the first and second embossing rollers 602, 604 are heated.

Figure 7:
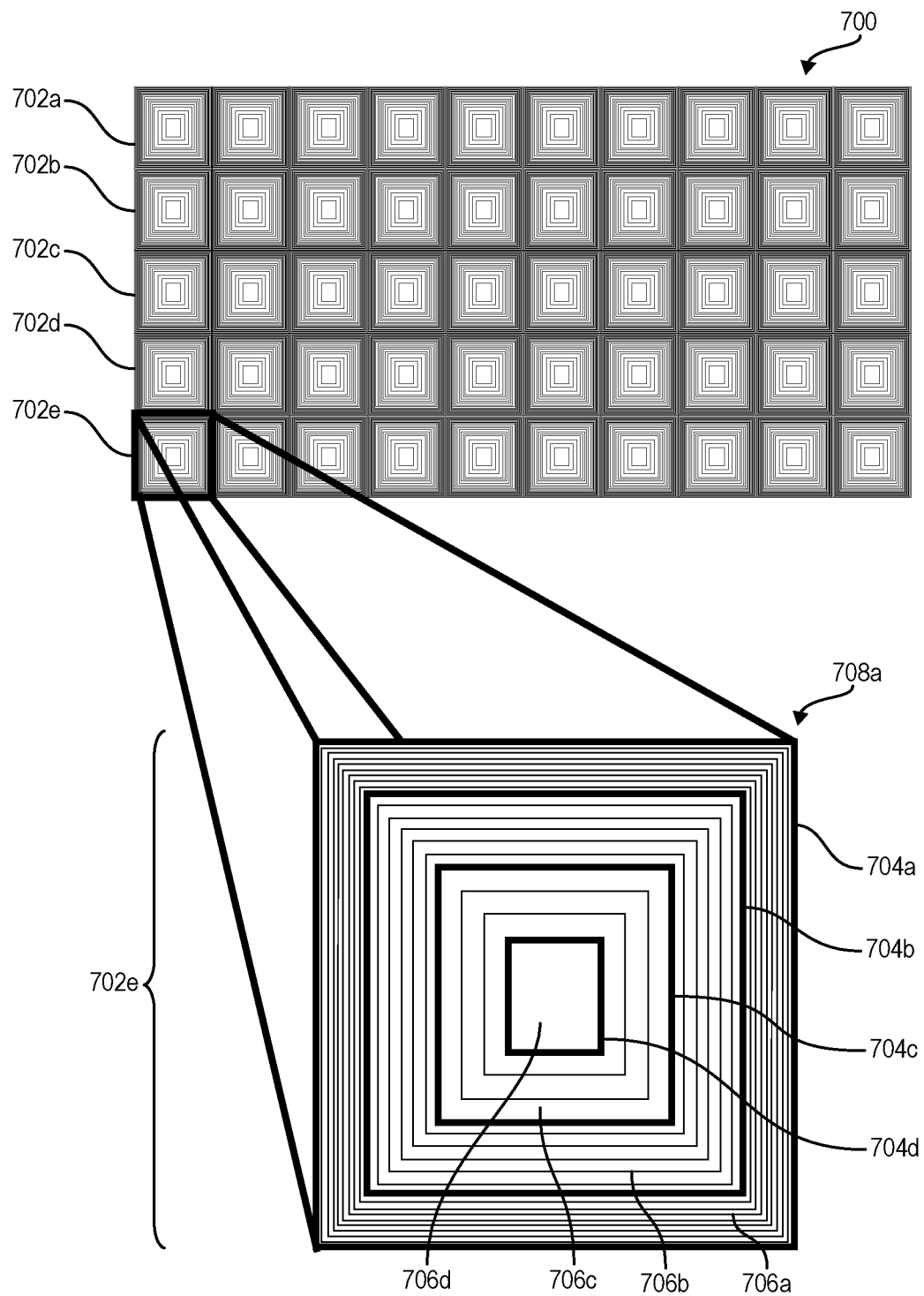
FIG. 7 shows a top view of a thermoplastic film with a three-dimensional pattern according to one or more implementations of the present disclosure.

Whether created by SELFing, ring rolling, embossing, or combinations thereof, the deformations can form a three-dimensional pattern. For example, FIG. 7 is a top view of a thermoplastic film 700 with a three-dimensional pattern 708a. In the implementation illustrated in FIG. 7, the three-dimensional pattern 708a includes sub-patterns that are positioned so as to create an illusion of height to the surface of the thermoplastic film 700. As discussed above, the illusion of height created by the three-dimensional pattern 708a makes the thermoplastic film 700 appear thicker.

As shown in FIG. 7, the three-dimensional pattern 708a is repeated in the thermoplastic film 700 in repeat units (e.g., the repeat units 702a, 702b, 702c, 702d, and 702e). In the illustrated implementation, the thermoplastic film 700 includes repeat units (e.g., the repeat units 702a-702e) of the same three-dimensional pattern 708a. In additional or alternative implementations, the thermoplastic film 700 can include repeat units including combinations of different three-dimensional patterns, or combinations of three-dimensional patterns and non-three-dimensional patterns, or combinations of three-dimensional patterns with non-patterned sections.

For ease of illustration, FIG. 7 also includes a blown-up view of the repeat unit 702e of the three-dimensional pattern 708a. As shown in the blown-up view of the repeat unit 702e, the three-dimensional pattern 708a includes four sub-patterns of deformations. For example, the first pattern 706a of deformations is between the indicator line 704a and the indicator line 704b. The second pattern 706b of deformations is between the indicator line 704b and the indicator line 704c. The third pattern 706c of deformations is between the indicator line 704c and the indicator line 704d. And the fourth pattern 706d is within the indicator line 704d. In one or more implementations, the indicator lines 704a-704d are included for ease of description and are not part of the three-dimensional pattern 708a.

In the example shown in FIG. 7, the three-dimensional pattern 708a is made of four concentric sub-patterns. Additionally, each sub-pattern (e.g., the patterns 706a-706c) is made of concentric sets of squares, where each sub-pattern includes nesting squares with varied spacing, where each sub-pattern features a unique spacing distance between each nesting square. While the inner-most sub-pattern (e.g., the pattern 706d) includes a single square. As such, each of the patterns 706a-706d are concentric to each other. As used herein, "concentric" refers to a pattern that is entirely surrounding or within another pattern.

Furthermore, as shown in FIG. 7, the number of nesting squares in each of the patterns 706a-706d is unique. For example, the number of nesting squares in the pattern 706a is more than the number of nesting squares in the pattern 706b, while the number of nesting squares in the pattern 706b is more than the number of nesting squares in the pattern 706c, and the number of nesting squares in the pattern 706c is more than the single square in the pattern 706d.

Thus, the plurality of deformations in the first pattern 706a includes s a first number of nesting squares at a first distance from each other. The plurality of deformations in the second pattern 706b includes a second number of nesting squares at a second distance from each other. The plurality of deformations in the third pattern 706c includes a third number of nesting squares at a third distance from each other. Each of the first, second, and third distances can differ from each other as shown.

While FIG. 7 includes a pattern of deformations arranged as squares, the present invention is not so limited. In alternative embodiments, the patterns of deformations can be arranged as polygon, a parabola, a circle, or a non-symmetric complex geometric shape, As discussed above, the deformations within the patterns 706a-706d can be created by various cold deformation processes. For example, if the thermoplastic film 700 is created via SELF'ing, the deformations within the patterns 706a-706d would be rib-like elements that extend in the Z-direction from the thermoplastic film 700. Alternatively, if the thermoplastic film 700 is created via embossing, such as described with reference to FIG. 6, the deformations with the patterns 706a-706d would be formations pressed into the surface of the thermoplastic film 700.

Figure 8A:
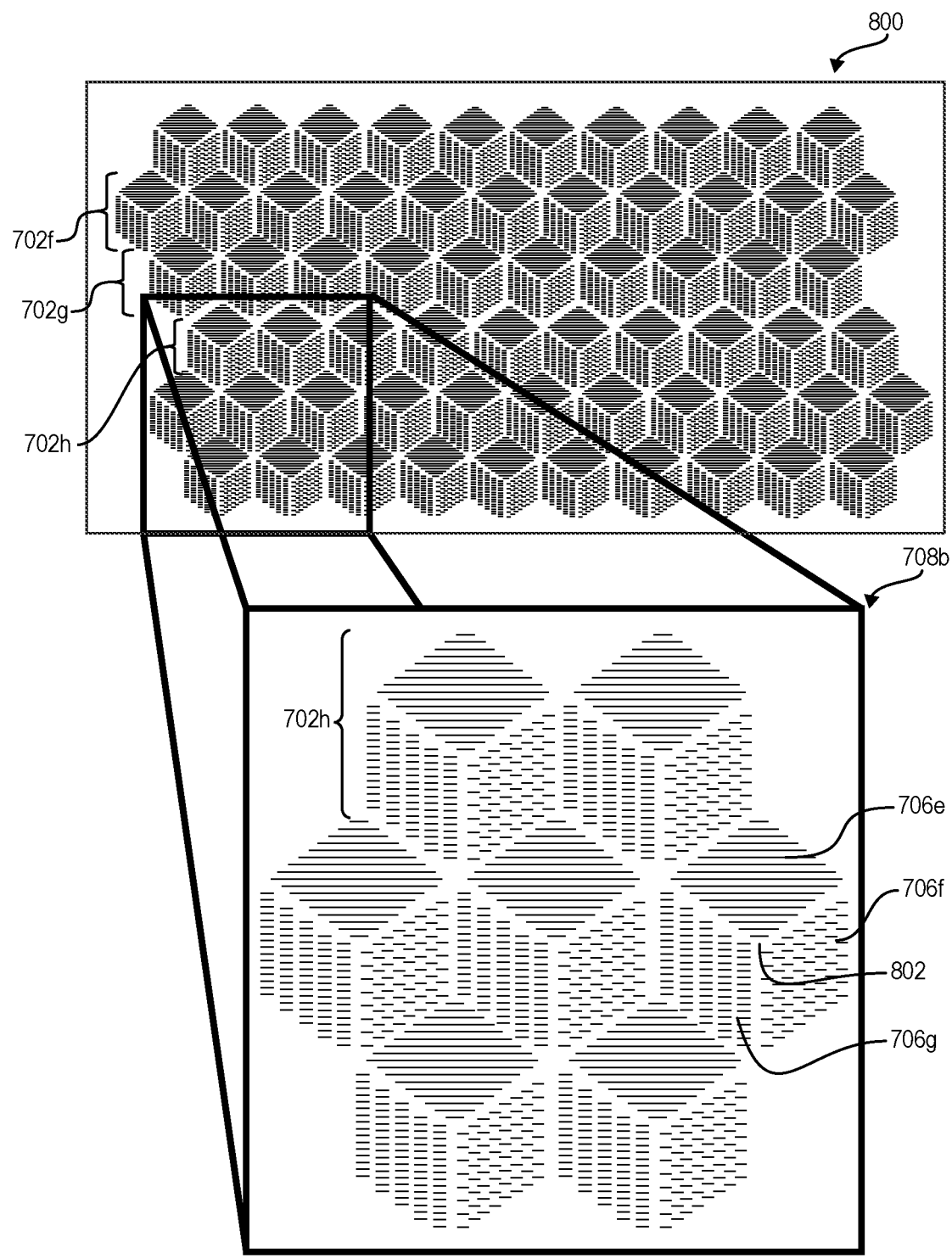
FIG. 8A shows a top view of a thermoplastic film with another three-dimensional pattern according to one or more implementations of the present disclosure.

FIG. 8A is a top view of another thermoplastic film 800 with a three-dimensional pattern 708b. In the implementation illustrated in FIG. 8A, the three-dimensional pattern 708b includes sub-patterns that are positioned to appear as a single object illuminated by a common light point source. As discussed above, the illusion of a single object illuminated by a common light point source makes the thermoplastic film 800 appear thicker.

As shown in FIG. 8A, the three-dimensional pattern 708b is repeated in the thermoplastic film 800 in repeat units (e.g., the repeat units 702f, 702g, and 702h). In the illustrated implementation, the thermoplastic film 800 includes repeat units (e.g., the repeat units 702f-702h) of the same three-dimensional pattern 708b. In additional or alternative implementations, as will FIG. 7 above, the thermoplastic film 800 can include repeat units including combinations of different three-dimensional patterns, or combinations of three-dimensional patterns and non-three-dimensional patterns, or combinations of three-dimensional patterns with non-patterned sections.

For ease of illustration, FIG. 8A also includes a blown-up view including the repeat unit 702h and other repeat units of the three-dimensional pattern 708b. As shown in the blown-up view, the three-dimensional pattern 708b includes three patterns of deformations. For example, the first pattern 706e of deformations, the second pattern 706f of deformations, and the third pattern 706g of deformations are adjacent to each other about a central point 802.

As further shown in FIG. 8A, each of the first pattern 706*e* of deformations, the second pattern 706*f* of deformations, and the third pattern 706*g* of deformations include unique pattern deformation densities. As used herein, "pattern deformation density" refers to the density, length, shape, and positioning of deformations within a given pattern. For example, the pattern deformation density of the first pattern 706*e* of deformations includes lined pattern deformations of varying lengths. The pattern deformation density of the second pattern 706*f* of deformations includes lined pattern deformations of uniform length that are staggered. The pattern deformation density of the third pattern 706*g* of deformations includes lined pattern deformations of uniform length that are evenly spaced. In additional or alternative implementations, a pattern of deformations can include differing pattern deformation densities than those shown.

Additionally, within the three-dimensional pattern 708*b*, each of the first pattern 706*e* of deformations, the second pattern 706*f* of deformations, and the third pattern 706*g* of deformations are the same shape. For example, as shown in FIG. 8A, each of the first pattern 706*e*, the second pattern 706*f*, and the third pattern 706*g* are diamond-shaped. In additional or alternative implementations, the patterns of the three-dimensional pattern 708*a* and/or the three-dimensional pattern 708*b* can have the same shape or can have different shapes.

Moreover, while the repeat units of the three-dimensional pattern 708*a* (e.g., the repeat units 702*a*, 702*b*, 702*c*, 702*d*, and 702*e*) are square-shaped, and the repeat units of the three-dimensional pattern 708*b* (e.g., the repeat units 702*f*, 702*g*, and 702*h*) are rhombus-shaped, the repeat units of alternative or additional three-dimensional patterns may have any shape. For example, the repeat units of alternative or additional three-dimensional patterns may be shaped as a polygon, a parabola, a circle, or any other non-symmetric complex geometric shape.

Additionally, as discussed above, the deformations within the patterns 706*e*-706*g* can be created by various cold deformation processes. For example, if the thermoplastic film 800 is created via SELF'ing, such as described with reference to FIGS. 2 and 5A, the deformations within the patterns 706*e*-706*g* would be rib-like elements that extend in the Z-direction from the thermoplastic film 800. Alternatively, if the thermoplastic film 800 is created via embossing, such as described with reference to FIG. 6, the deformations with the patterns 706*e*-706*g* would be formations pressed into the surface of the thermoplastic film 800.

Alternative implementations may include a three-dimensional pattern formed by other means. For example, in one alternative implementation, a three-dimensional pattern is formed by varying the height of the rib-like elements within the pattern, rather than by varying the pattern element density, as described with reference to FIGS. 7 and 8. For instance, in a three-dimensional pattern including varying rib-like elements heights, a first pattern of the three-dimension pattern may include a first height, while a second pattern of the three-dimensional pattern includes a second height, and a third pattern of the three-dimensional pattern includes a third height. The elements of the first, second, and third patterns may include the same pattern element density, but their varying depths of engagement create a three-dimensional effect. When used in connection with a multi-layer thermoplastic film with different colored film layers, the varying depths within the patterns of a three-dimensional pattern creates an even more dramatic effect.

Figure 8B:
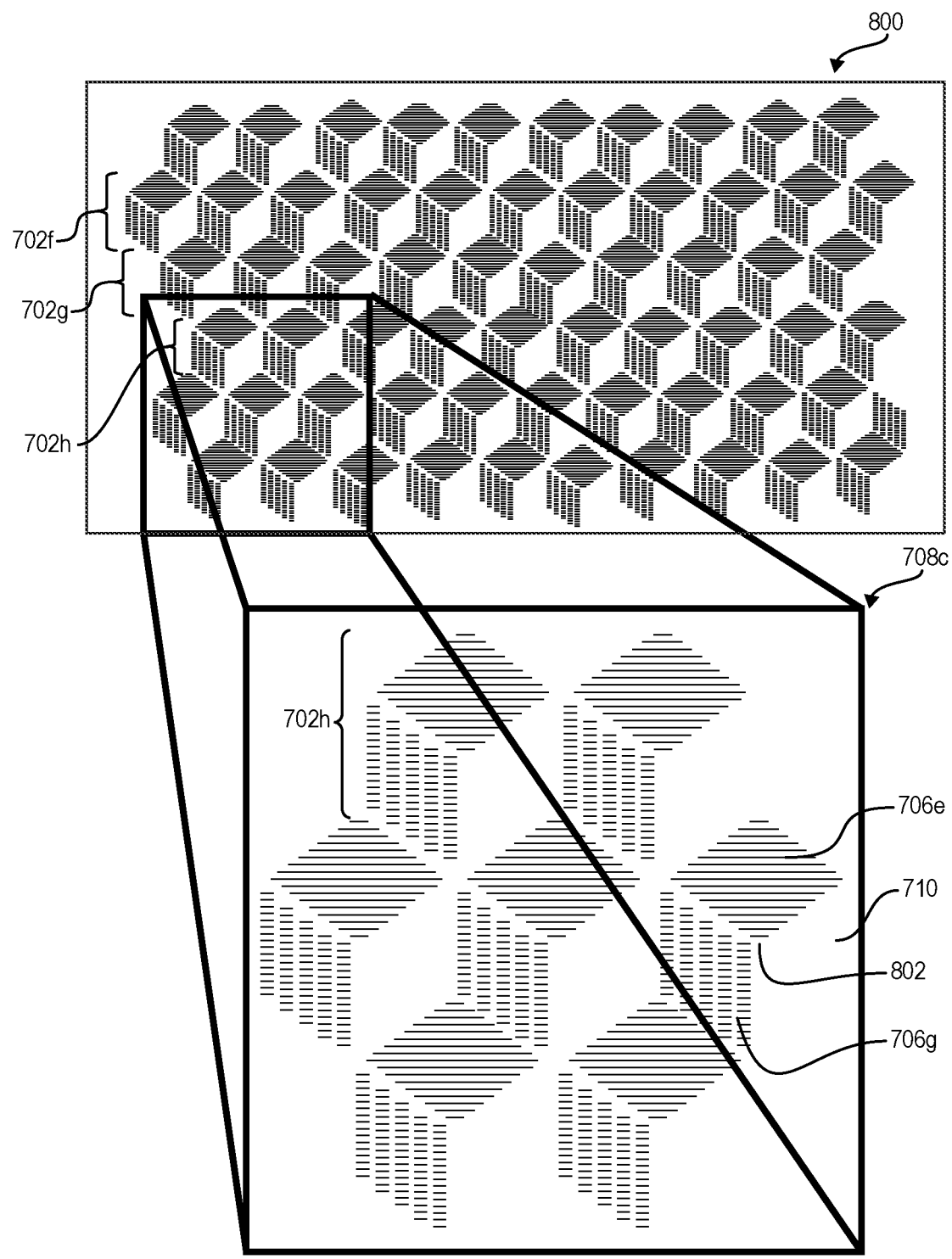
FIG. 8B shows a top view of a thermoplastic film with yet another three-dimensional pattern according to one or more implementations of the present disclosure.

FIG. 8B is a top view of another implementation of another three-dimensional pattern 708*c*. As shown in FIG. 8B, while the previously illustrated three-dimensional pattern 708*b* includes three patterns 706*e*-706*g*, the three-dimensional pattern 708*c* includes the pattern 706*e* and the pattern 706*g*. The remainder of the three-dimensional pattern 708*c* includes pattern area 710 including no pattern elements. In at least one embodiment, the pattern area 710 serves as a third type of pattern that completes the three-dimensional effect of the three-dimensional pattern 708*c*. As further shown in FIG. 8B, the pattern area 710 does not change the shape or size of the repeat units 702*f*-702*h*.

Figure 9:
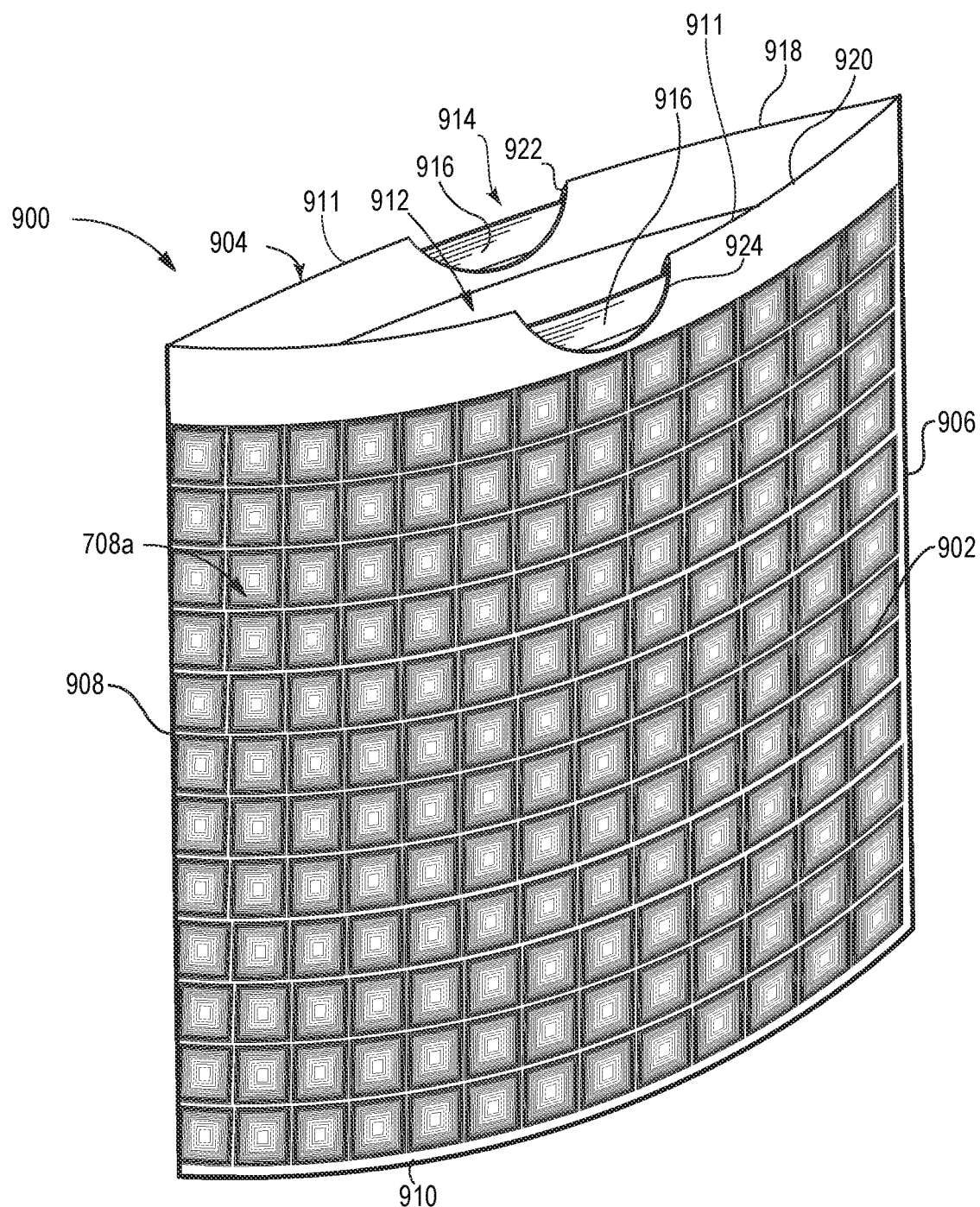
FIG. 9 shows a perspective view of a thermoplastic bag with the three-dimensional pattern of FIG. 7 according to one or more implementations of the present disclosure.

As mentioned above, one or more implementations of the present disclosure include products made from or with such thermoplastic films with three-dimensional patterns. For example, such products include, but are not limited to, grocery bags, trash bags, sacks, and packaging materials, feminine hygiene products, baby diapers, adult incontinence products, or other products. The remaining figures describe various bags including three-dimensional patterns and methods of making the same. For example, FIG. 9 is a perspective view of a thermoplastic bag 900 with a three-dimensional pattern 708*a* according to an implementation of the present disclosure. The thermoplastic bag 900 with a three-dimensional pattern includes a first sidewall 902 and a second sidewall 904. Each of the first and second sidewalls 902, 904 includes a first side edge 906, a second opposite side edge 908, a bottom edge 910 extending between the first and second side edges 906, 908, and top edge 911 extending between the first and second side edges 906, 908 opposite the bottom edge 910. In some implementations, the first sidewall 902 and the second sidewall 904 are joined together along the first side edges 906, the second opposite side edges 908, and the bottom edges 910. The first and second sidewalls 902, 904 may be joined along the first and second side edges 906, 908 and bottom edges 910 by any suitable process such as, for example, a heat seal. In alternative implementations, the first and second sidewalls 902, 904 may not be joined along the side edges. Rather, the first and second sidewalls 902, 904 may be a single uniform piece. In other words, the first and second sidewalls 902, 904 may form a sleeve or a balloon structure.

In some implementations, the bottom edge 910 or one or more of the side edges 906, 908 can comprise a fold. In other words, the first and second sidewalls 902, 904 may comprise a single unitary piece of material. The top edges 911 of the first and second sidewalls 902, 904 may define an opening 912 to an interior of the thermoplastic bag 900 with a three-dimensional pattern. In other words, the opening 912 may be oriented opposite the bottom edge 910 of the thermoplastic bag 900 with a three-dimensional pattern. Furthermore, when placed in a trash receptacle, the top edges 911 of the first and second sidewalls 902, 904 may be folded over the rim of the receptacle.

In some implementations, the thermoplastic bag 900 with a three-dimensional pattern may optionally include a closure mechanism 914 located adjacent to the top edges 911 for sealing the top of the thermoplastic bag 900 with a three-dimensional pattern to form an at least substantially fully-enclosed container or vessel. As shown in FIG. 9, in some implementations, the closure mechanism 914 comprises a draw tape 916, a first hem 918, and a second hem 920. In particular, the first top edge 911 of the first sidewall 902 may be folded back into the interior volume and may be attached to an interior surface of the first sidewall 902 to form the first hem 918. Similarly, the second top edge 911 of the second sidewall 904 is folded back into the interior volume and may be attached to an interior surface of the second sidewall 904 to form a second hem 920. The draw tape 916 extends through the first and second hems 918, 920 along the first and second top edges 911. The first hem 918 includes a first aperture 922 (e.g., notch) extending through the first hem 918 and exposing a portion of the draw tape 916. Similarly, the second hem 920 includes a second aperture 924 extending through the second hem 920 and exposing another portion of the draw tape 916. During use, pulling the draw tape 916 through the first and second apertures 922, 924 will cause the first and second top edge 911 to constrict. As a result, pulling the draw tape 916 through the first and second apertures 922, 924 will cause the opening 912 of the thermoplastic bag with a three-dimensional pattern to at least partially close or reduce in size. The draw tape closure mechanism 914 may be used with any of the implementations of a reinforced thermoplastic bag described herein.

Although the thermoplastic bag 900 with a three-dimensional pattern is described herein as including a draw tape closure mechanism 914, one of ordinary skill in the art will readily recognize that other closure mechanisms 914 may be implemented into the thermoplastic bag 900 with a three-dimensional pattern. For example, in some implementations, the closure mechanism 914 may include one or more of flaps, adhesive tapes, a tuck and fold closure, an interlocking closure, a slider closure, a zipper closure, or any other closure structures known to those skilled in the art for closing a bag.

While the thermoplastic bag 900 shown and described above includes a single three-dimensional pattern formed in the entire sidewalls of the bag, one will appreciate in light of the disclosure herein that the present invention is not so limited. In alternative embodiments, a thermoplastic bag can comprise three-dimensional patterns in zones or areas so as to provide tailored properties to different areas of the thermoplastic bag.

Figure 10:
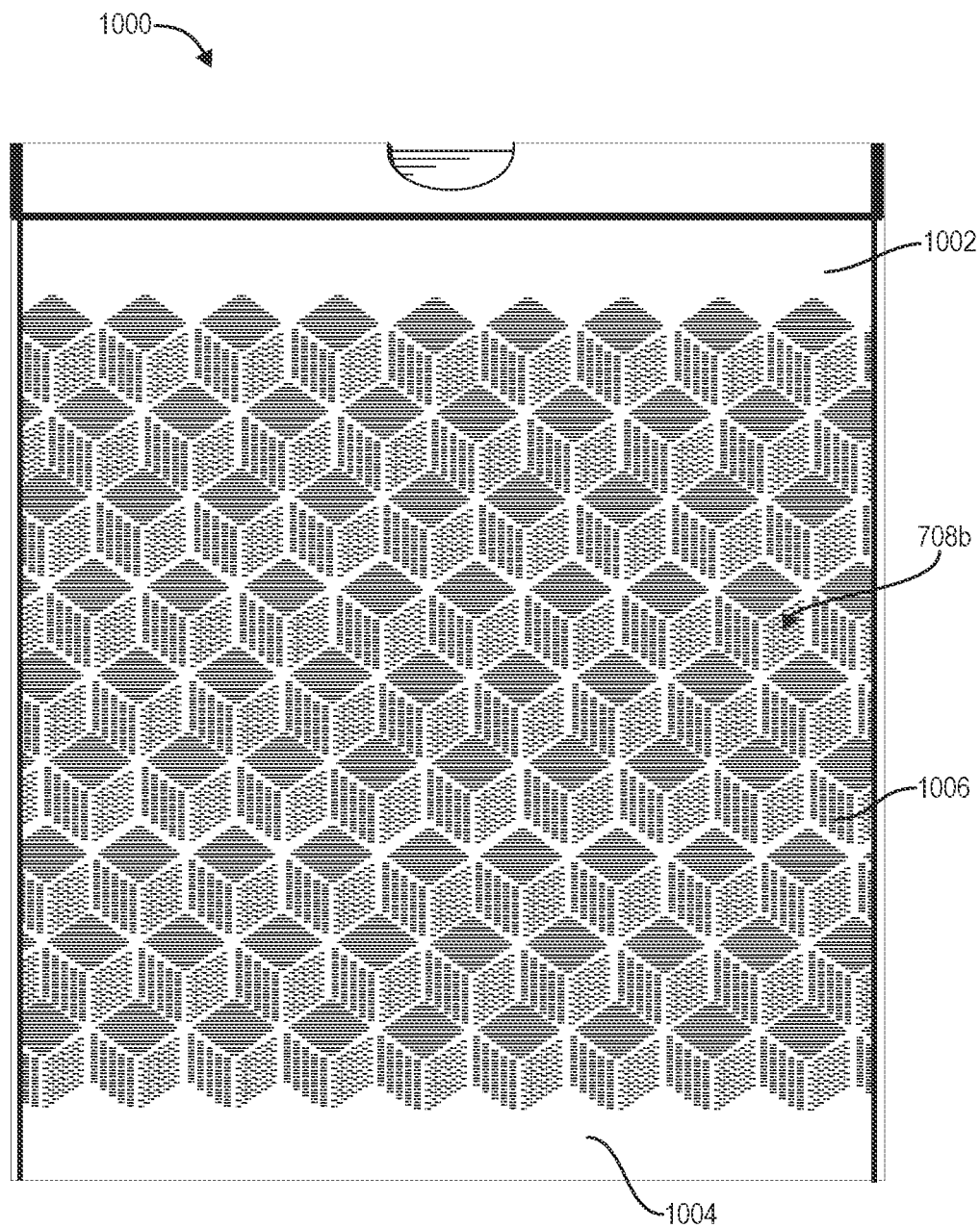
FIG. 10 shows a front side view of a thermoplastic bag with a three-dimensional pattern in a zone across the width of the thermoplastic bag according to one or more implementations of the present disclosure.

For example, FIG. 10 illustrates another thermoplastic bag 1000 with sidewalls including multiple zones. As shown in FIG. 10, the thermoplastic bag 1000 includes a top zone 1002, a bottom zone 1004, and a middle zone 1006. As further shown in FIG. 10, the top zone 1002 and the bottom zone 1004 are devoid of any pattern (e.g., three-dimensional or otherwise), while the middle zone 1006 includes the three-dimensional pattern 708b formed therein. The thermoplastic bag 1000 can include the same structure as the thermoplastic bag 900 described above with reference to FIG. 9, albeit with a different three-dimensional pattern.

Figure 11:
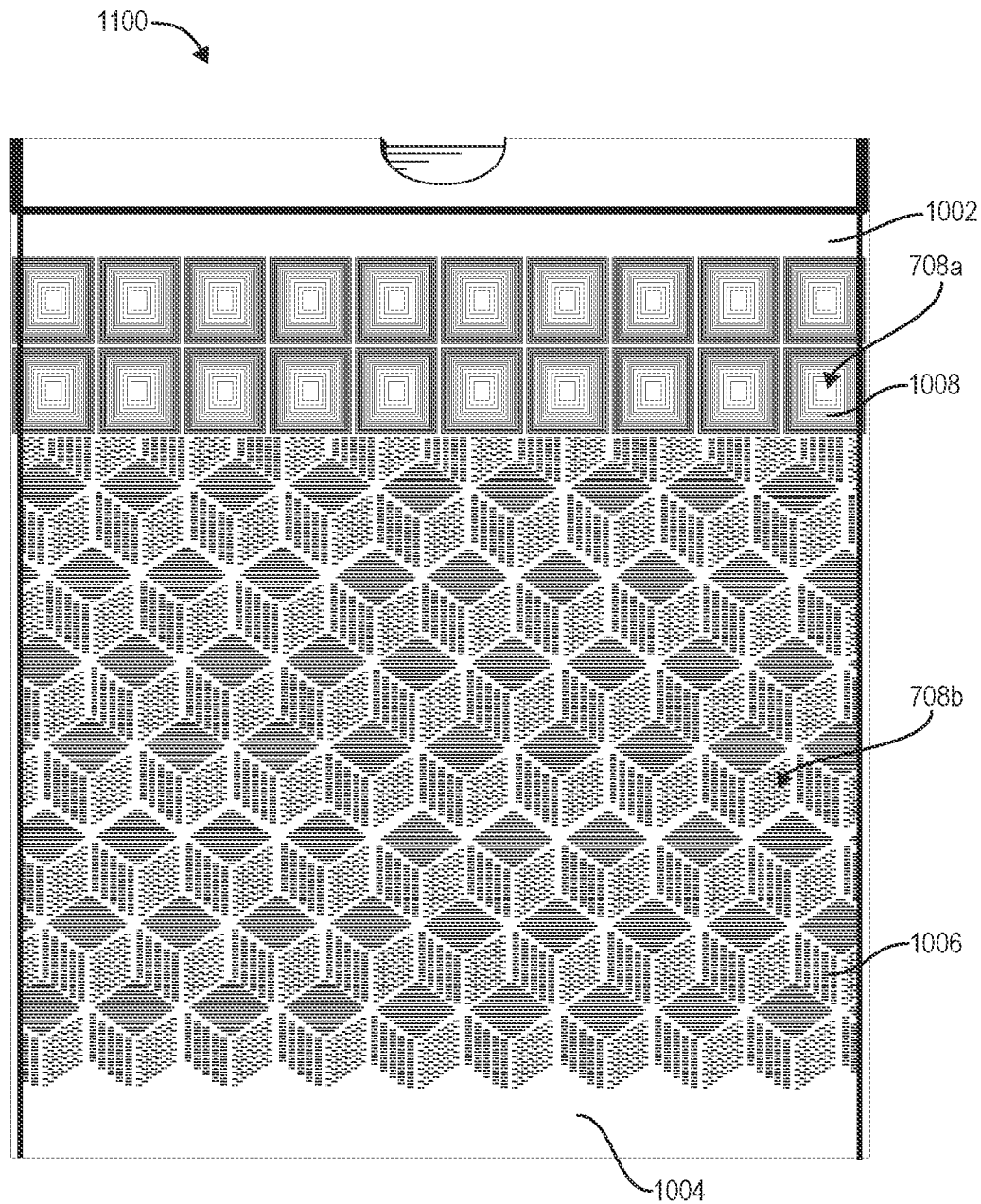
FIG. 11 shows a front side view of a thermoplastic bag with a combination of multiple different three-dimensional patterns according to one or more implementations of the present disclosure.

In another embodiments, a thermoplastic bag can comprise multiple three-dimensional patterns in zones or areas so as to provide tailored properties to different areas of the thermoplastic bag. For example, FIG. 11 illustrates a thermoplastic bag 1100 including the top zone 1002, the bottom zone 1004, the first middle zone 1006 and a second middle zone 1008. As with the thermoplastic bag 1000 illustrated in FIG. 10, the top zone 1002 and the bottom zone 1004 of the thermoplastic bag 1100 are devoid of any pattern. The first middle zone 1006 includes the three-dimensional pattern 708b formed therein, while the second middle zone 1008 includes the three-dimensional pattern 708a formed therein. The thermoplastic bag 1100 can include the same structure as the thermoplastic bag 900 described above with reference to FIG. 9 and/or the thermoplastic bag 1000 described above with reference to FIG. 10, albeit with a different three-dimensional pattern.

Figure 12:
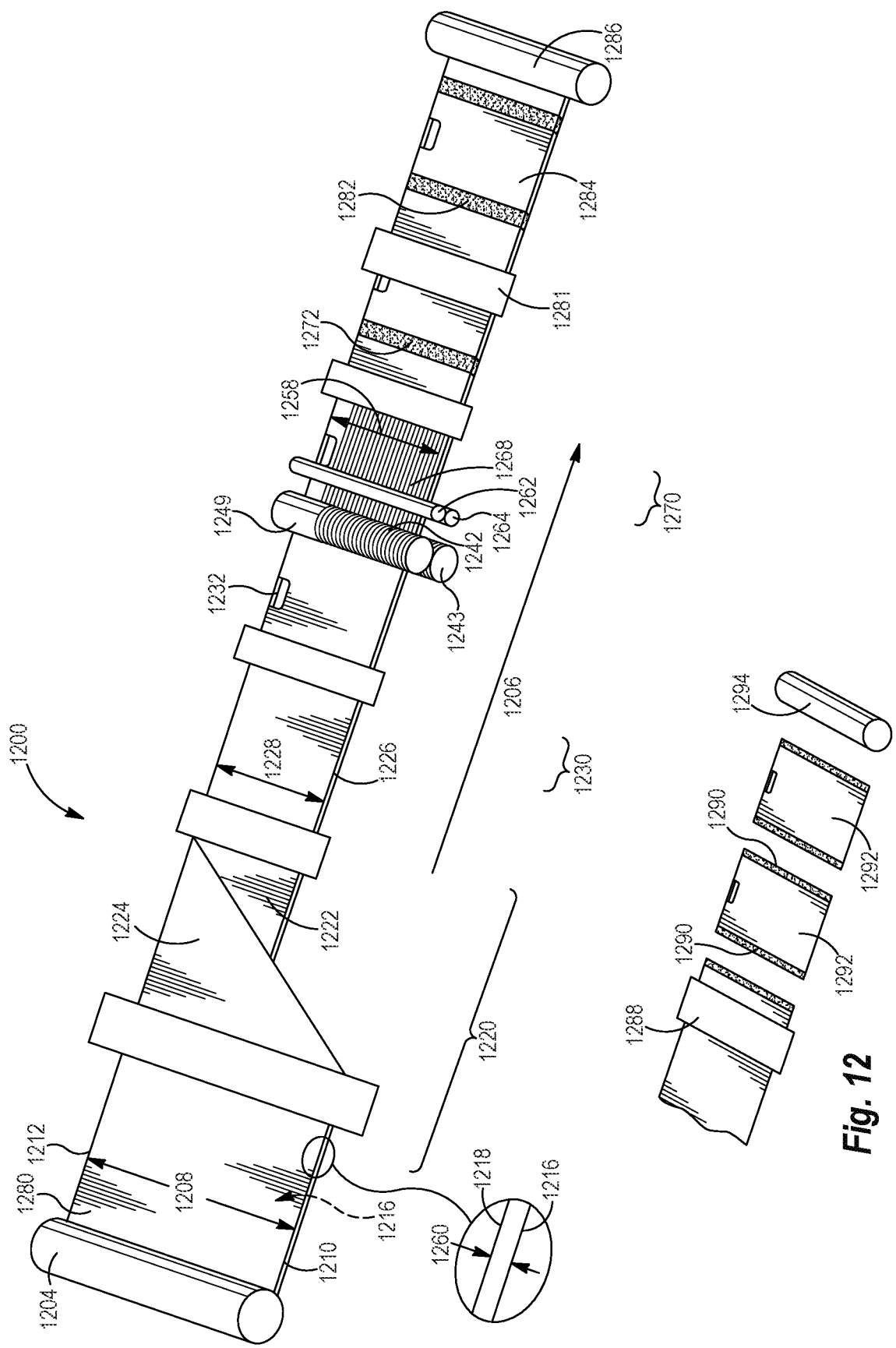
FIG. 12 illustrates a schematic diagram of a process for manufacturing thermoplastic bags with three-dimensional patterns in accordance with one or more implementations of the present disclosure.

To produce a bag having a three-dimensional pattern as described, continuous webs of thermoplastic material may be processed through a high-speed manufacturing environment such as that illustrated in FIG. 12. In the illustrated process 1200, production may begin by unwinding a first continuous web or film 1280 of thermoplastic sheet material from a roll 1204 and advancing the web along a machine direction 1206. The unwound web 1280 may have a width 1208 that may be perpendicular to the machine direction 1206, as measured between a first edge 1210 and an opposite second edge 1212. The unwound web 1280 may have an initial average thickness 1260 measured between a first surface 1216 and a second surface 1218. In other manufacturing environments, the web 1280 may be provided in other forms or even extruded directly from a thermoplastic forming process. To provide the first and second sidewalls of the finished bag, the web 1280 may be folded into a first half 1222 and an opposing second half 1224 about the machine direction 1206 by a folding operation 1220. When so folded, the first edge 1210 may be moved adjacent to the second edge 1212 of the web. Accordingly, the width of the web 1280 proceeding in the machine direction 1206 after the folding operation 1220 may be a width 1228 that may be half the initial width 1208. As may be appreciated, the portion mid-width of the unwound web 1280 may become the outer edge of the folded web. In any event, the hems may be formed along the adjacent first and second edges 1210, 1212 and a draw tape 1232 may be inserted during a hem and draw tape operation 1230.

To form a pattern 1268, the processing equipment may include ring rolling, SELF'ing or embossing intermeshing rollers 1242, 1243 such as those described herein above. Referring to FIG. 12, the folded web 1280 may be advanced along the machine direction 1206 between the intermeshing rollers 1242, 1243, which may be set into rotation in opposite rotational directions to impart the resulting pattern 1268. To facilitate patterning of the web 1280, the first roller 1242 and second roller 1243 may be forced or directed against each other by, for example, hydraulic actuators. The pressure at which the rollers are pressed together may be in a first range from 30 PSI (2.04 atm) to 100 PSI (6.8 atm), a second range from 60 PSI (4.08 atm) to 90 PSI (6.12 atm), and a third range from 75 PSI (5.10 atm) to 85 PSI (5.78 atm). In one or more implementations, the pressure may be about 80 PSI (5.44 atm).

In the illustrated implementation, the pattern 1268 intermeshing rollers 1242, 1243 may be arranged so that they are co-extensive with or wider than the width 1208 of the folded web 1280. In one or more implementations, the pattern 1268 intermeshing rollers 1242, 1243 may extend from proximate the folded edge 1226 to the adjacent edges 1210, 1212. To avert imparting the pattern 1268 onto the portion of the web that includes the draw tape 1232, the corresponding ends 1249 of the rollers 1242, 1243 may be smooth and without the ridges and grooves. Thus, the adjacent edges 1210, 1212 and the corresponding portion of the web proximate those edges that pass between the smooth ends 1249 of the rollers 1242, 1243 may not be imparted with the pattern 1268. While FIG. 12 illustrates a single pair of intermeshing rollers, one or more embodiments can include multiple pairs of intermeshing rollers so as to be able to produce a desired number of patterns of deformations.

The processing equipment may include pinch rollers 1262, 1264 to accommodate the width 1258 of the web 1280. To produce the finished bag, the processing equipment may further process the folded web with the pattern. For example, to form the parallel side edges of the finished bag, the web may proceed through a sealing operation 1270 in which heat seals 1272 may be formed between the folded edge 1226 and the adjacent edges 1210, 1212. The heat seals may fuse together the adjacent halves 1222, 1224 of the folded web. The heat seals 1272 may be spaced apart along the folded web and in conjunction with the folded outer edge 1226 may define individual bags. The heat seals may be made with a heating device, such as, a heated knife. A perforating operation 1281 may perforate 1282 the heat seals 1272 with a perforating device, such as, a perforating knife so that individual bags 1290 may be separated from the web. In one or more implementations, the webs may be folded one or more times before the folded webs may be directed through the perforating operation. The web 1280 embodying the bags 1284 may be wound into a roll 1286 for packaging and distribution. For example, the roll 1286 may be placed in a box or a bag for sale to a customer.

In one or more implementations of the process, a cutting operation 1288 may replace the perforating operation 1280. The web is directed through a cutting operation 1288 which cuts the webs at location 1290 into individual bags 1292 prior to winding onto a roll 1294 for packaging and distribution. For example, the roll 1294 may be placed in a box or bag for sale to a customer. The bags may be interleaved prior to winding into the roll 1294. In one or more implementations, the web may be folded one or more times before the folded web is cut into individual bags. In one or more implementations, the bags 1292 may be positioned in a box or bag, and not onto the roll 1294.

Figure 13:
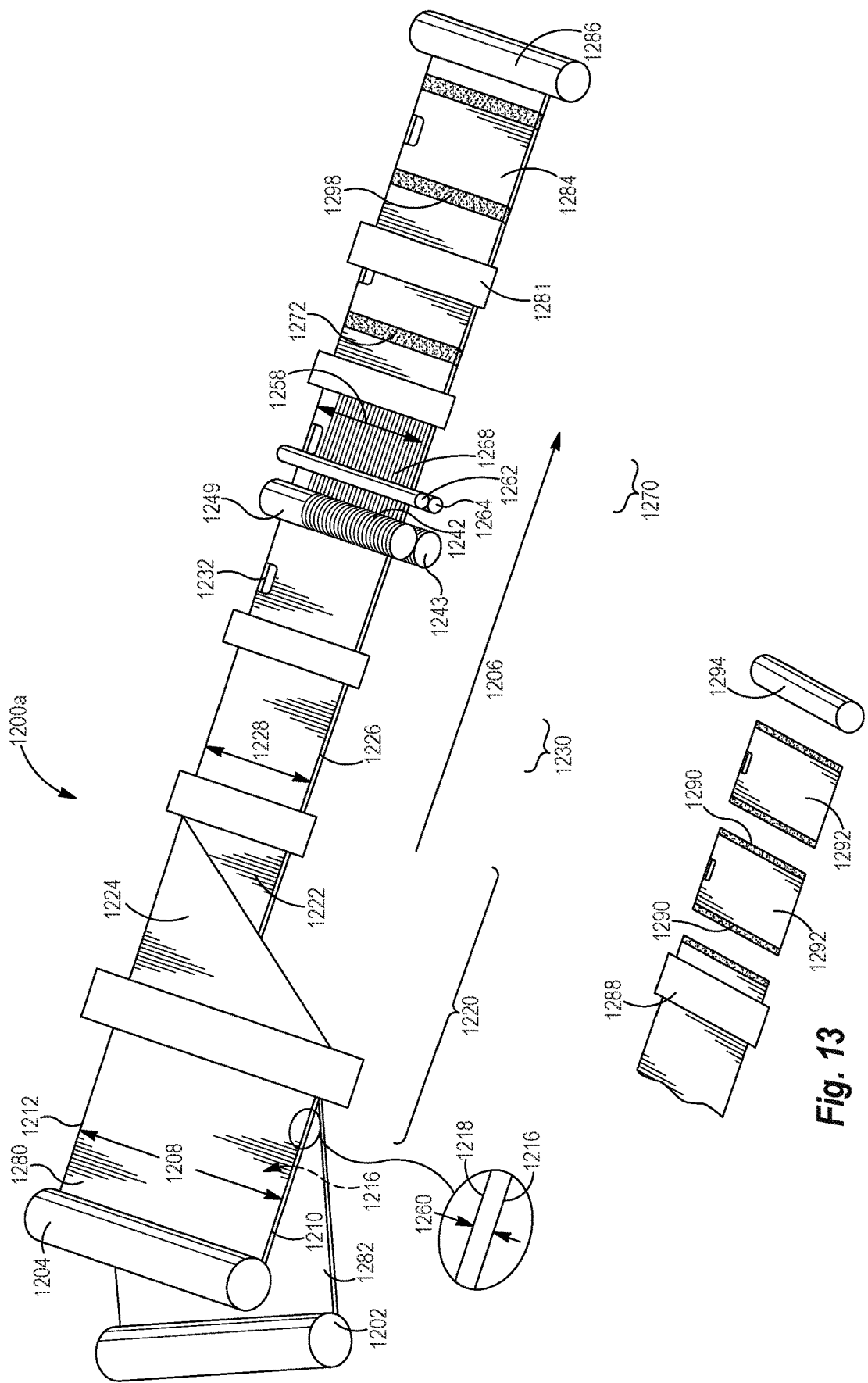
FIG. 13 illustrates a schematic diagram of a process for manufacturing thermoplastic bags with three-dimensional patterns in accordance with one or more implementations of the present disclosure.

FIG. 13 illustrates a modified high-speed manufacturing 1200a that involves unwinding a second continuous web or film 1282 of thermoplastic sheet material from a roll 1202 and advancing the web along a machine direction 1206. The second film 1282 can comprise a thermoplastic material, a width, and/or a thickness that is similar or the same as the first film 1280. In alternative one or more implementations, one or more of the thermoplastic material, width, and/or thickness of the second film 1282 can differ from that of the first film 1280. The films 1280, 1282 can be folded together during the folding operation 1220 such that they pass through the intermeshing rollers 1242, 1243 together to form the pattern and resulting multi-layered bags.

The present disclosure may be embodied in other specific forms without departing from its spirit or essential characteristics. For example, the illustrated and described implementations involve non-continuous (i.e., discontinuous or partially discontinuous lamination) to provide the weak bonds. In alternative implementations, the lamination may be continuous. For example, multi film layers could be co-extruded so that the layers have a bond strength that provides for delamination prior to film failure to provide similar benefits to those described above. Thus, the described implementations are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

We claim:

1. A thermoplastic bag with one or more patterns formed by post-formation deformation, the thermoplastic bag comprising:
a first plurality of deformations in a first pattern;
a second plurality of deformations in a second pattern;
a third plurality of deformations in a third pattern; and
a fourth plurality of deformations in a fourth pattern,
wherein the first pattern is concentric to the second pattern, the second pattern is concentric to the third pattern, and the third pattern is concentric to the fourth pattern,
wherein the first plurality of deformations in the first pattern is a first number of nesting squares at a first distance from each other, the second plurality of deformations in the second pattern is a second number of nesting squares at a second distance from each other, the third plurality of deformations in the third pattern is a third number of nesting squares at a third distance from each other, and the fourth pattern is a single square, and
wherein the first pattern, the second pattern, and the third pattern provide a three-dimensional appearance to the thermoplastic bag.

2. The thermoplastic bag of claim 1, wherein:
the first plurality is more than the second plurality; and
the second plurality is more than the third plurality.

3. The thermoplastic bag of claim 1, wherein:
the first pattern comprises a first pattern deformation density;
the second pattern comprises a second pattern deformation density; and
the third pattern comprises a third pattern deformation density.

4. The thermoplastic bag of claim 3, wherein the first plurality of deformations, the second plurality of deformations, and the third plurality of deformations are adjacent to each other about a central point.

5. The thermoplastic bag of claim 4, wherein the first plurality of deformations, the second plurality of deformations, and the third plurality of deformations are positioned to appear as a single object illuminated by a common light point source.

6. The thermoplastic bag of claim 1, wherein:
the first pattern comprises deformations having a first height;
the second pattern comprises deformations having a second height; and
the third pattern comprises deformations having a third height.

7. The thermoplastic bag of claim 1, wherein the first pattern is a first shape, the second pattern is a second shape, and the third pattern is a third shape.

8. The thermoplastic bag of claim 1, wherein the first pattern, the second pattern, and the third pattern form a repeat unit.

9. The thermoplastic bag of claim 8, wherein the repeat unit comprises at least one of a polygon, a parabola, a circle, or a non-symmetric complex geometric shape.

10. A thermoplastic bag with one or more patterns formed by post-formation deformation, the thermoplastic bag comprising:
a first sidewall and a second sidewall joined together along a first side edge, a second side edge, and a bottom edge;
an opening opposite the bottom edge;
a first plurality of deformations in a first pattern formed in the first and second sidewalls;
a second plurality of deformations in a second pattern formed in the first and second sidewalls;
a third plurality of deformations in a third pattern formed in the first and second sidewalls; and
a fourth plurality of deformations in a fourth pattern,
wherein the first pattern is concentric to the second pattern, the second pattern is concentric to the third pattern, and the third pattern is concentric to the fourth pattern,
wherein the first plurality of deformations in the first pattern is a first number of nesting squares at a first distance from each other, the second plurality of deformations in the second pattern is a second number of nesting squares at a second distance from each other, the third plurality of deformations in the third pattern is a third number of nesting squares at a third distance from each other, and the fourth pattern is a single square, and wherein the first pattern, the second pattern, and the third pattern provide a three-dimensional appearance to the first and second sidewalls of the thermoplastic bag.

11. The thermoplastic bag of claim 10, wherein:
the first plurality is more than the second plurality; and
the second plurality is more than the third plurality.

12. The thermoplastic bag of claim 11, wherein:
the first pattern comprises a first pattern deformation density;
the second pattern comprises a second pattern deformation density; and
the third pattern comprises a third pattern deformation density.

13. The thermoplastic bag of claim 10, wherein:
the first pattern comprises deformations having a first height;
the second pattern comprises deformations having a second height, and
the third pattern comprises deformations having a third height.

* * * * *